(12) United States Patent
Malott et al.

(10) Patent No.: US 10,258,180 B2
(45) Date of Patent: Apr. 16, 2019

(54) HOOK RAIL

(71) Applicant: THE HILLMAN GROUP, INC., Cincinnati, OH (US)

(72) Inventors: Dale G. Malott, Chandler, AZ (US); Gary E. Will, Gold Canyon, AZ (US); Byron K. Grice, Phoenix, AZ (US); Ryan Hamblin, Apache Junction, AZ (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 0 days.

(21) Appl. No.: 15/255,907

(22) Filed: Sep. 2, 2016

(65) Prior Publication Data
US 2017/0127867 A1    May 11, 2017

Related U.S. Application Data

(60) Provisional application No. 62/251,873, filed on Nov. 6, 2015.

(51) Int. Cl.
*A47G 29/00* (2006.01)
*F16B 45/00* (2006.01)
*F16B 21/08* (2006.01)

(52) U.S. Cl.
CPC .............. *A47G 29/00* (2013.01); *F16B 45/00* (2013.01); *F16B 21/086* (2013.01)

(58) Field of Classification Search
CPC ......... F16B 21/086; F16B 45/00; A47G 29/00
USPC ...................................................... 211/94.01
See application file for complete search history.

(56) References Cited

U.S. PATENT DOCUMENTS

| 113,862 A | 4/1871 | Duffett |
|---|---|---|
| 165,206 A | 7/1875 | Brown |
| 251,616 A | 12/1881 | McGill |
| 297,173 A | 4/1884 | Seliger |
| 371,205 A | 10/1887 | McConnoughay |

(Continued)

FOREIGN PATENT DOCUMENTS

| CN | 2449598 Y | 9/2001 |
|---|---|---|
| CN | 201542372 U | 8/2010 |

(Continued)

OTHER PUBLICATIONS

PCT, International Search Report and Written Opinion of International Application No. PCT/US2016/50101, dated Feb. 1, 2017, 10 pages.

(Continued)

*Primary Examiner* — Stanton L Krycinski
(74) *Attorney, Agent, or Firm* — Thompson Hine L.L.P.

(57) ABSTRACT

A hook rail assembly for hanging objects on a wall includes an elongated rail member for abutting the wall, at least one anchor component connected to a back side of the rail member and at least one hook member positioned at a front side of the rail member. The anchor component including a base and at least one wall penetrating retainer, the wall penetrating retainer having a wall penetrating extent that that protrudes rearwardly of the rail member and has a curved configuration. The wall penetrating extent may be arcuate and have a radius of curvature with a center point proximate a bottom side of the rail member.

19 Claims, 28 Drawing Sheets

(56) References Cited

U.S. PATENT DOCUMENTS

| | | | |
|---|---|---|---|
| 423,730 A * | 3/1890 | Charlton | F16B 37/045 |
| | | | 24/DIG. 53 |
| 444,933 A | 1/1891 | Barnes | |
| 489,593 A | 1/1893 | Ramer | |
| 763,448 A | 6/1904 | Winter | |
| 769,794 A | 9/1904 | Fowler | |
| 777,879 A | 12/1904 | Blum | |
| 795,704 A | 7/1905 | Jones | |
| 874,412 A | 12/1907 | Lewis | |
| 938,998 A | 11/1909 | Evans | |
| 965,151 A | 7/1910 | Benjamin | |
| 992,203 A | 5/1911 | Johnson | |
| 998,015 A | 7/1911 | Kopsa | |
| 1,002,910 A | 9/1911 | Foote | |
| 1,270,718 A | 6/1918 | Ford | |
| 1,306,114 A | 6/1919 | Koval | |
| 1,343,855 A | 6/1920 | Tyler | |
| 1,425,873 A | 8/1922 | Lineaweaver | |
| 1,651,392 A | 12/1927 | Honigbaum | |
| 1,802,934 A | 4/1931 | Balch | |
| 1,883,834 A | 10/1932 | Turner | |
| 1,958,497 A * | 5/1934 | Rivers | E05B 1/0015 |
| | | | 16/441 |
| 2,062,887 A | 12/1936 | Karst | |
| 2,119,931 A | 6/1938 | Smith | |
| 2,197,750 A | 4/1940 | Lagaard | |
| 2,295,370 A | 9/1942 | Tritt | |
| 2,317,368 A | 4/1943 | Frey | |
| 2,334,700 A | 11/1943 | Frey | |
| 2,505,324 A | 4/1950 | Cornelius | |
| 2,539,825 A | 1/1951 | Genua | |
| 2,577,011 A | 12/1951 | Hallenscheid | |
| 2,751,807 A | 6/1956 | Harre | |
| 2,980,309 A | 4/1961 | Papas | |
| 3,001,752 A | 9/1961 | Loy | |
| 3,004,815 A | 10/1961 | O'Kain | |
| 3,020,602 A | 2/1962 | Siering | |
| 3,174,592 A | 3/1965 | Berman | |
| 3,226,065 A | 12/1965 | Smith | |
| 3,298,651 A | 1/1967 | Passer | |
| 3,319,917 A | 5/1967 | Bilodeau | |
| 3,425,568 A | 2/1969 | Albright | |
| 3,503,147 A | 3/1970 | Herrin | |
| 3,524,584 A | 8/1970 | Ihlenfeld | |
| 3,620,404 A | 11/1971 | Grasso | |
| 3,640,497 A | 2/1972 | Waki | |
| 3,666,936 A | 5/1972 | Webster | |
| 3,685,778 A | 8/1972 | Berns | |
| 3,754,805 A | 8/1973 | Pangburn | |
| 3,775,884 A | 12/1973 | Smith | |
| 3,813,800 A | 6/1974 | Turner | |
| 3,861,631 A | 1/1975 | Shorin | |
| 3,891,172 A | 6/1975 | Einhorn | |
| 3,912,211 A | 10/1975 | Topf | |
| 3,926,394 A | 12/1975 | Mauceri et al. | |
| 3,966,157 A | 6/1976 | Corral et al. | |
| 3,995,822 A | 12/1976 | Einhorn et al. | |
| 4,017,048 A | 4/1977 | Einhorn | |
| 4,039,138 A | 8/1977 | Einhorn | |
| 4,040,149 A | 8/1977 | Einhorn | |
| 4,082,243 A * | 4/1978 | Watt, Jr. | A47B 95/02 |
| | | | 248/205.1 |
| 4,083,314 A | 4/1978 | Garvin | |
| 4,124,189 A | 11/1978 | Einhorn | |
| 4,134,625 A | 1/1979 | Palka | |
| D255,301 S | 6/1980 | Windisch | |
| 4,208,012 A | 6/1980 | Dutcher | |
| 4,221,442 A | 9/1980 | Harangozo | |
| 4,228,982 A | 10/1980 | Sellera | |
| 4,237,630 A | 12/1980 | Franzone | |
| 4,262,605 A | 4/1981 | Sokol | |
| 4,293,173 A | 10/1981 | Tricca | |
| 4,294,778 A | 10/1981 | DeLuca | |
| 4,300,745 A | 11/1981 | Peterson | |
| 4,304,447 A | 12/1981 | Ellwood | |
| 4,317,603 A | 3/1982 | Pepicelli | |
| 4,333,625 A | 6/1982 | Haug | |
| 4,340,144 A | 7/1982 | Cousins | |
| 4,372,450 A * | 2/1983 | Licari | A47G 25/0678 |
| | | | 211/106.01 |
| 4,422,608 A | 12/1983 | Hogg | |
| 4,452,500 A | 6/1984 | Zlotnik | |
| 4,458,387 A | 7/1984 | Pearson | |
| 4,485,995 A | 12/1984 | Hogg | |
| 4,505,226 A | 3/1985 | Carlson | |
| 4,506,856 A | 3/1985 | Rich | |
| 4,509,713 A | 4/1985 | Hogg | |
| 4,572,380 A | 2/1986 | Langwell | |
| 4,583,647 A | 4/1986 | Schinzing | |
| D285,743 S | 9/1986 | Richwine | |
| 4,613,108 A | 9/1986 | Sundstrom et al. | |
| D286,118 S | 10/1986 | Gecchelin | |
| 4,655,423 A | 4/1987 | Schavilje et al. | |
| 4,681,380 A | 7/1987 | Carlin | |
| 4,719,917 A | 1/1988 | Barrows et al. | |
| 4,831,754 A | 5/1989 | Tallent | |
| 4,932,519 A | 6/1990 | Trauschke | |
| 4,976,057 A | 12/1990 | Bianchi | |
| 4,998,361 A | 3/1991 | Gordon | |
| 5,110,080 A | 5/1992 | Rieman | |
| 5,135,194 A | 8/1992 | Laughon | |
| 5,149,037 A | 9/1992 | Smith | |
| 5,241,715 A | 9/1993 | Duvall | |
| 5,265,357 A | 11/1993 | Yu | |
| 5,267,715 A | 12/1993 | Owen | |
| 5,267,719 A | 12/1993 | Keller | |
| 5,325,815 A | 7/1994 | Gumpesberger | |
| 5,332,108 A | 7/1994 | Blass | |
| 5,351,842 A | 10/1994 | Remmers | |
| 5,372,346 A * | 12/1994 | Upchurch | F16B 21/04 |
| | | | 248/222.52 |
| 5,401,094 A | 3/1995 | Walsten | |
| 5,477,010 A | 12/1995 | Buckshaw | |
| 5,484,126 A | 1/1996 | Kitchin | |
| 5,495,954 A | 3/1996 | Schmidt | |
| 5,507,248 A | 4/1996 | Gabbed | |
| 5,517,947 A | 5/1996 | Christman | |
| 5,570,938 A | 11/1996 | Butler | |
| 5,586,934 A | 12/1996 | Dombrowski | |
| 5,638,644 A | 6/1997 | Bastian | |
| 5,641,079 A | 6/1997 | Schmidt | |
| 5,727,698 A * | 3/1998 | Lai | A47F 7/02 |
| | | | 211/87.01 |
| 5,743,038 A | 4/1998 | Soto | |
| 5,806,223 A | 9/1998 | Visagie | |
| D399,692 S | 10/1998 | Wilcox | |
| 5,819,958 A | 10/1998 | Dement | |
| 5,839,649 A | 11/1998 | Clark | |
| 5,878,988 A | 3/1999 | Rakower | |
| 6,042,243 A | 3/2000 | Grill | |
| 6,045,374 A | 4/2000 | Candeloro | |
| 6,051,788 A | 4/2000 | Nichols | |
| 6,109,461 A | 5/2000 | Kluge | |
| 6,126,126 A | 10/2000 | McKiernan, Jr. | |
| D434,303 S | 11/2000 | DeCosta | |
| 6,158,828 A | 12/2000 | Vacovsky | |
| D436,841 S | 1/2001 | Carpenter | |
| 6,179,136 B1 | 1/2001 | Kluge | |
| 6,202,838 B1 | 3/2001 | Tran | |
| 6,279,862 B1 | 8/2001 | Gershowitz | |
| 6,299,001 B1 | 10/2001 | Frolov | |
| 6,325,345 B1 | 12/2001 | Carpenter | |
| 6,351,905 B1 | 3/2002 | Dean | |
| 6,371,427 B1 | 4/2002 | Johnson | |
| 6,431,510 B1 | 8/2002 | Puritz | |
| D465,348 S | 11/2002 | Lucatello | |
| 6,478,273 B1 | 11/2002 | McKiernan, Jr. et al. | |
| 6,585,205 B2 | 7/2003 | Beaty | |
| 6,641,107 B1 | 11/2003 | Janssen | |
| 6,641,344 B2 | 11/2003 | Weiss | |
| D486,057 S | 2/2004 | Chen | |
| D494,452 S | 8/2004 | Sheldon et al. | |
| 6,775,935 B1 | 8/2004 | Cohen et al. | |
| 6,830,228 B2 | 12/2004 | Ernst | |

(56) References Cited

U.S. PATENT DOCUMENTS

| | | |
|---|---|---|
| 6,932,225 B2 | 8/2005 | Rowe |
| D511,088 S | 11/2005 | Chiu |
| D513,562 S | 1/2006 | Boffo |
| D515,911 S | 2/2006 | McDuff |
| 6,994,448 B1 | 2/2006 | Gorrell |
| D516,412 S | 3/2006 | McDuff |
| D517,344 S | 3/2006 | Zens |
| 7,086,543 B2 | 8/2006 | Remmers |
| 7,146,760 B2 | 12/2006 | Yiu |
| 7,225,935 B2 | 6/2007 | Breymaier |
| D554,483 S | 11/2007 | Hager et al. |
| 7,395,998 B2 | 7/2008 | Peterson |
| 7,398,013 B2 | 7/2008 | He |
| 7,431,258 B2 | 10/2008 | Lamotta |
| 7,497,028 B2 | 3/2009 | Nevers et al. |
| 7,506,772 B2 | 3/2009 | Chen |
| D596,930 S | 7/2009 | Gaudron |
| 7,591,097 B2 | 9/2009 | Alman |
| D606,185 S | 12/2009 | Wefler |
| 7,669,723 B2 * | 3/2010 | Kao .................. B25H 3/04 206/349 |
| 7,694,401 B2 | 4/2010 | Peterson |
| 7,708,252 B2 | 5/2010 | Vander Berg et al. |
| 7,900,783 B2 | 3/2011 | Fernandez |
| D635,843 S | 4/2011 | McDuff et al. |
| D636,256 S | 4/2011 | McDuff et al. |
| 7,931,159 B2 * | 4/2011 | Kao .................. B25H 3/04 211/70.6 |
| D649,022 S | 11/2011 | McDuff et al. |
| D649,023 S | 11/2011 | McDuff et al. |
| D649,436 S | 11/2011 | McDuff et al. |
| D649,437 S | 11/2011 | McDuff et al. |
| D649,438 S | 11/2011 | McDuff et al. |
| D649,439 S | 11/2011 | McDuff et al. |
| D650,261 S | 12/2011 | McDuff et al. |
| 8,074,603 B2 | 12/2011 | Ohlman |
| 8,114,226 B2 | 2/2012 | Ernst et al. |
| 8,210,368 B2 | 7/2012 | Schwartzkopf |
| 8,272,610 B2 | 9/2012 | Ernst et al. |
| 8,308,116 B2 | 11/2012 | Daniels |
| 8,317,148 B2 | 11/2012 | Ernst et al. |
| D672,224 S | 12/2012 | Brinson et al. |
| 8,333,356 B2 | 12/2012 | Ernst et al. |
| 8,398,048 B2 | 3/2013 | Popkin et al. |
| 8,414,239 B2 | 4/2013 | McDuff |
| 8,434,629 B2 | 5/2013 | Fernanadez |
| 8,448,910 B2 | 5/2013 | Ernst et al. |
| 8,667,765 B1 | 3/2014 | McCarthy |
| 8,740,171 B2 | 6/2014 | Crescenzo |
| 8,757,570 B2 | 6/2014 | Ernst et al. |
| 8,813,404 B2 | 8/2014 | Goppion |
| 8,833,876 B2 | 9/2014 | Lee |
| 8,839,964 B2 | 9/2014 | Hawkins |
| 8,857,780 B1 | 10/2014 | Goss |
| D717,114 S | 11/2014 | Katterheinrich |
| 8,974,166 B2 | 3/2015 | McDuff |
| D731,716 S | 6/2015 | Kuiper |
| 9,044,110 B2 | 6/2015 | McDuff et al. |
| D744,773 S | 12/2015 | Yoon |
| 9,261,229 B2 | 2/2016 | Callif et al. |
| 9,296,552 B2 | 3/2016 | Schleuning |
| 9,307,837 B2 | 4/2016 | Wood |
| 9,380,885 B1 | 7/2016 | Nguyen |
| 9,496,695 B2 | 11/2016 | Battaglia |
| 9,563,078 B2 | 2/2017 | Ryu |
| 9,593,523 B1 | 3/2017 | Trimble |
| D783,907 S | 4/2017 | Ohlman |
| 9,668,596 B2 | 6/2017 | Crescenzo |
| D797,464 S | 9/2017 | Vitale |
| 9,826,828 B1 | 11/2017 | Vaughan |
| D804,287 S | 12/2017 | Baldwin |
| 2002/0026736 A1 | 3/2002 | Spencer |
| 2002/0088912 A1 | 7/2002 | Yu |
| 2002/0182910 A1 | 12/2002 | Kiughadush |
| 2003/0071182 A1 | 4/2003 | Beaty et al. |
| 2003/0161680 A1 | 8/2003 | Suckow |
| 2003/0178545 A1 | 9/2003 | Ernst |
| 2004/0231218 A1 | 11/2004 | Dominioni |
| 2004/0261307 A1 | 12/2004 | Siegel |
| 2005/0000854 A1 | 1/2005 | Madigan |
| 2005/0279041 A1 | 12/2005 | Staples |
| 2006/0180557 A1 | 8/2006 | Weinstein |
| 2006/0182517 A1 | 8/2006 | McDuff |
| 2007/0006504 A1 | 1/2007 | Kao |
| 2007/0063119 A1 * | 3/2007 | Huang ............... A47G 25/0635 248/304 |
| 2007/0084743 A1 | 4/2007 | Chu |
| 2007/0124910 A1 | 6/2007 | Peterson et al. |
| 2007/0194202 A1 | 8/2007 | Lamotta |
| 2007/0205344 A1 | 9/2007 | Liermann et al. |
| 2007/0235622 A1 | 10/2007 | Baran et al. |
| 2007/0256850 A1 | 11/2007 | Hansen |
| 2008/0187688 A1 | 8/2008 | Gunther |
| 2008/0251682 A1 | 10/2008 | Repac |
| 2008/0283205 A1 | 11/2008 | Zimmer |
| 2008/0296456 A1 | 12/2008 | Lien |
| 2008/0302936 A1 | 12/2008 | Forbes et al. |
| 2009/0015121 A1 | 1/2009 | Sampson |
| 2009/0145804 A1 | 6/2009 | Kabel |
| 2009/0307953 A1 | 12/2009 | Ahlstrom |
| 2010/0084530 A1 | 4/2010 | Lai |
| 2010/0178448 A1 | 7/2010 | Nakajima |
| 2010/0213333 A1 | 8/2010 | Mejia et al. |
| 2010/0219312 A1 | 9/2010 | Johnson et al. |
| 2010/0300999 A1 | 12/2010 | Schwartzkopf |
| 2010/0326019 A1 | 12/2010 | Lofgren |
| 2011/0147236 A1 | 6/2011 | Johnson |
| 2011/0188250 A1 | 8/2011 | Waldhuetter |
| 2012/0001039 A1 | 1/2012 | McDuff et al. |
| 2012/0001040 A1 | 1/2012 | McDuff et al. |
| 2012/0056051 A1 | 3/2012 | Gold |
| 2012/0080343 A1 | 4/2012 | Gretz |
| 2012/0146470 A1 | 6/2012 | Katz |
| 2013/0105426 A1 | 5/2013 | Dyck |
| 2014/0144055 A1 | 5/2014 | Byfield |
| 2014/0212602 A1 | 7/2014 | Thornton |
| 2014/0231604 A1 | 8/2014 | Long |
| 2014/0259840 A1 | 9/2014 | Placko |
| 2014/0263122 A1 | 9/2014 | Roberts |
| 2014/0263924 A1 | 9/2014 | Crescenzo |
| 2014/0346310 A1 | 11/2014 | Yang |
| 2015/0060627 A1 | 3/2015 | Stauber |
| 2015/0308613 A1 | 10/2015 | Callif et al. |
| 2016/0029814 A1 | 2/2016 | Brown |
| 2017/0000270 A1 | 1/2017 | Will |
| 2017/0246546 A1 | 8/2017 | Brown |
| 2017/0347812 A1 | 12/2017 | Will |
| 2018/0100617 A1 * | 4/2018 | Forrest ................... A47H 1/102 |

FOREIGN PATENT DOCUMENTS

| | | |
|---|---|---|
| GB | 676903 | 8/1952 |
| WO | WO 1999/052741 | 10/1999 |
| WO | WO 2007/095351 A2 | 8/2007 |
| WO | WO 2015/150222 | 10/2015 |

OTHER PUBLICATIONS

List of Patents or Patent Applications Treated as Related, submitted herewith.

* cited by examiner

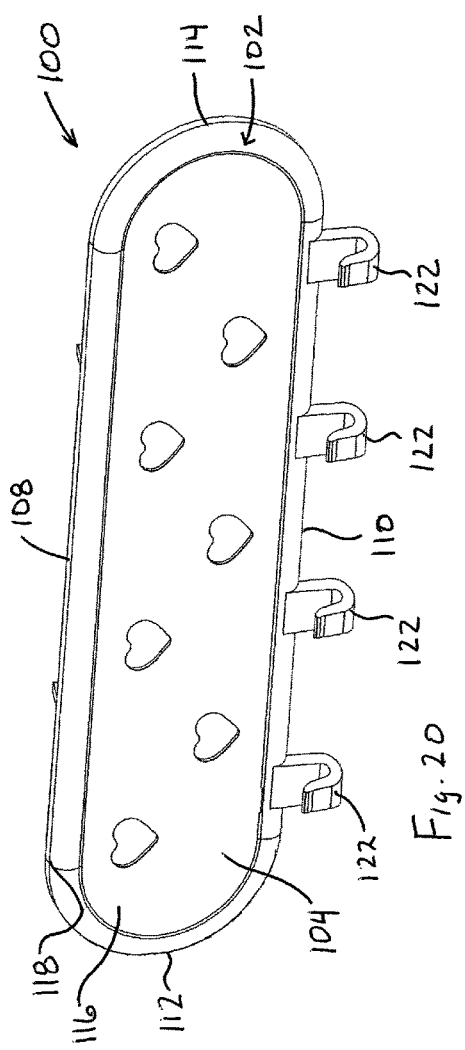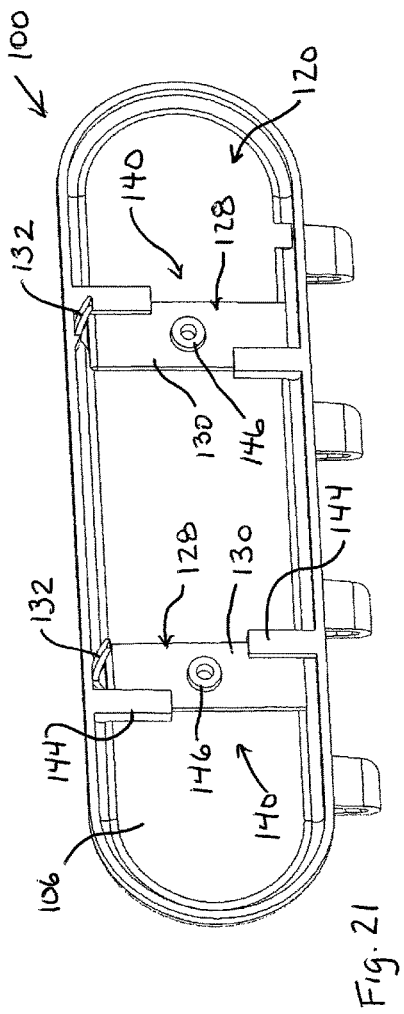

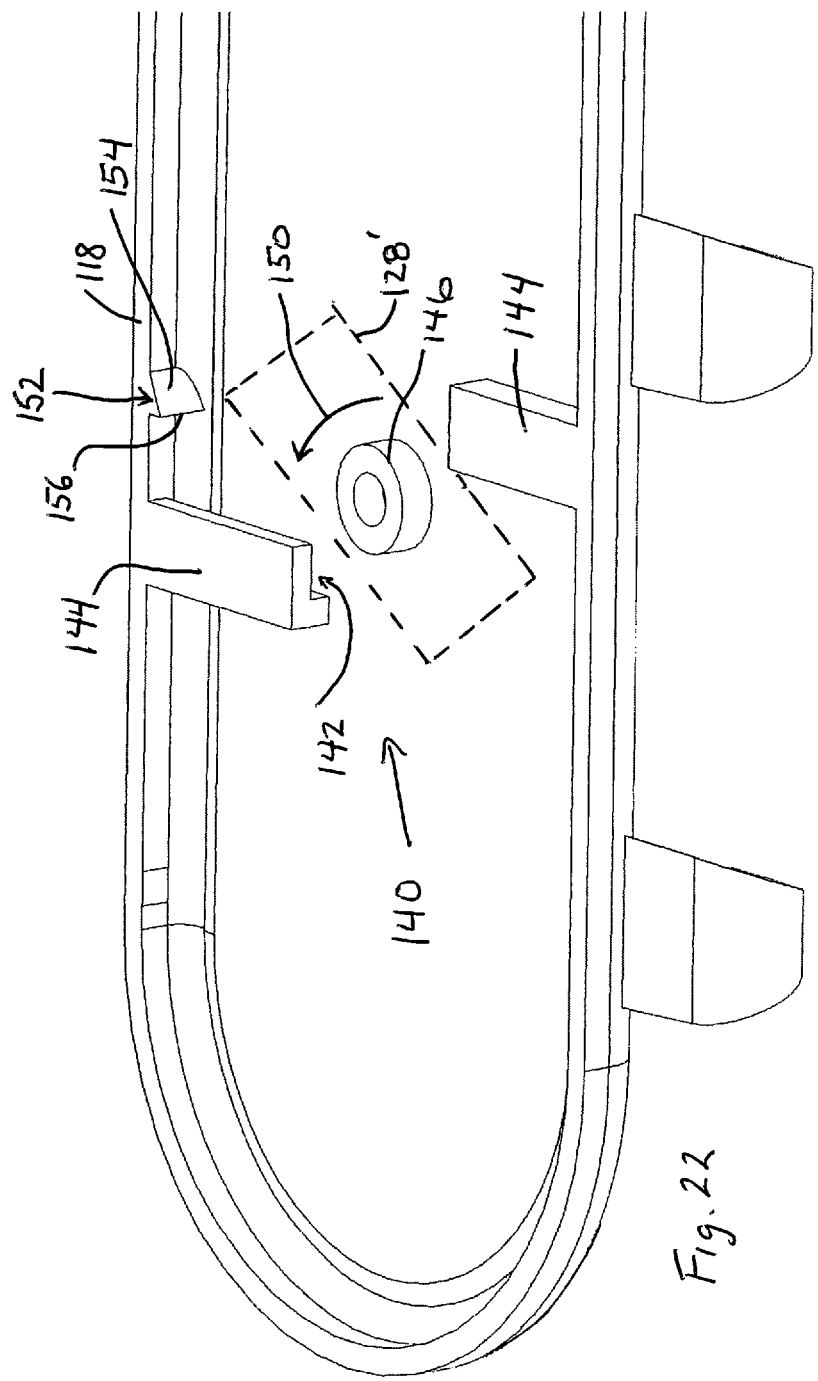

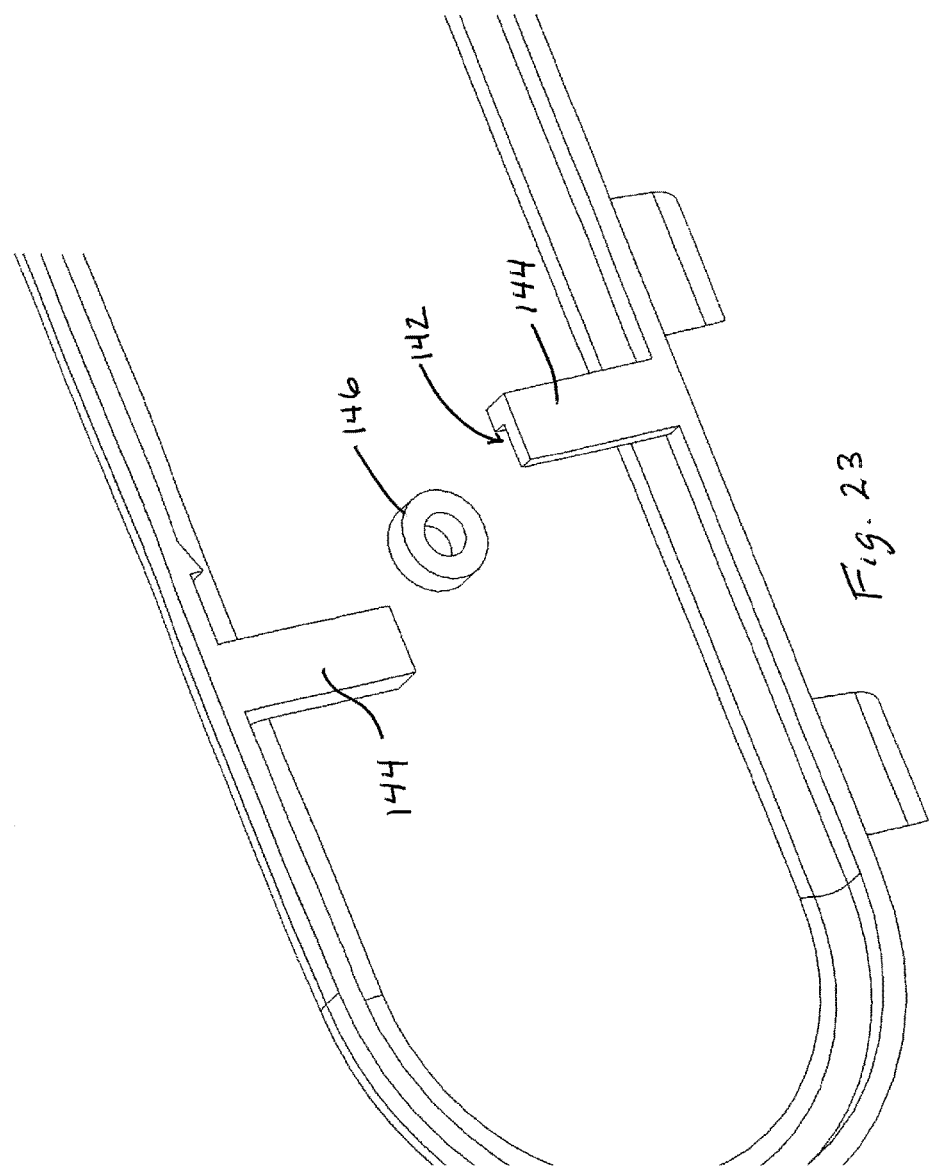

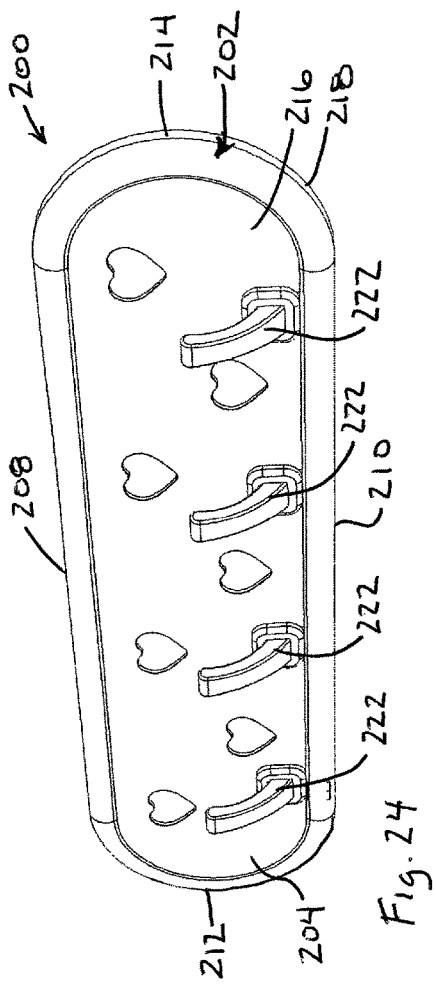
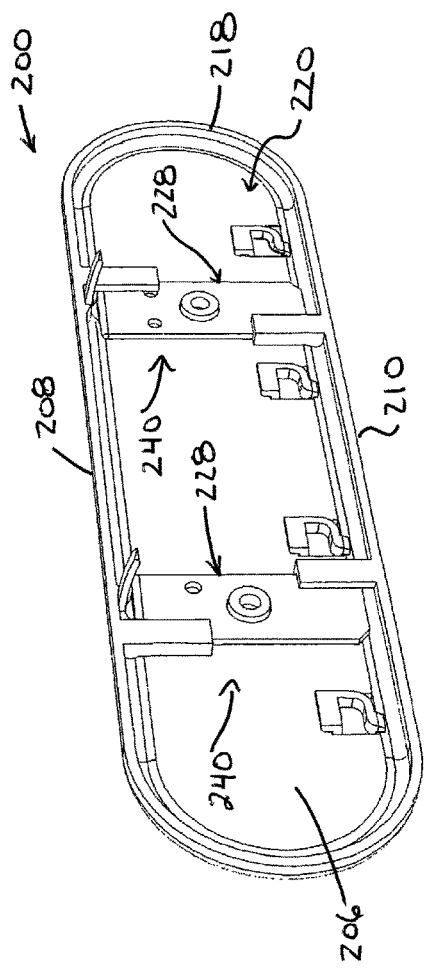

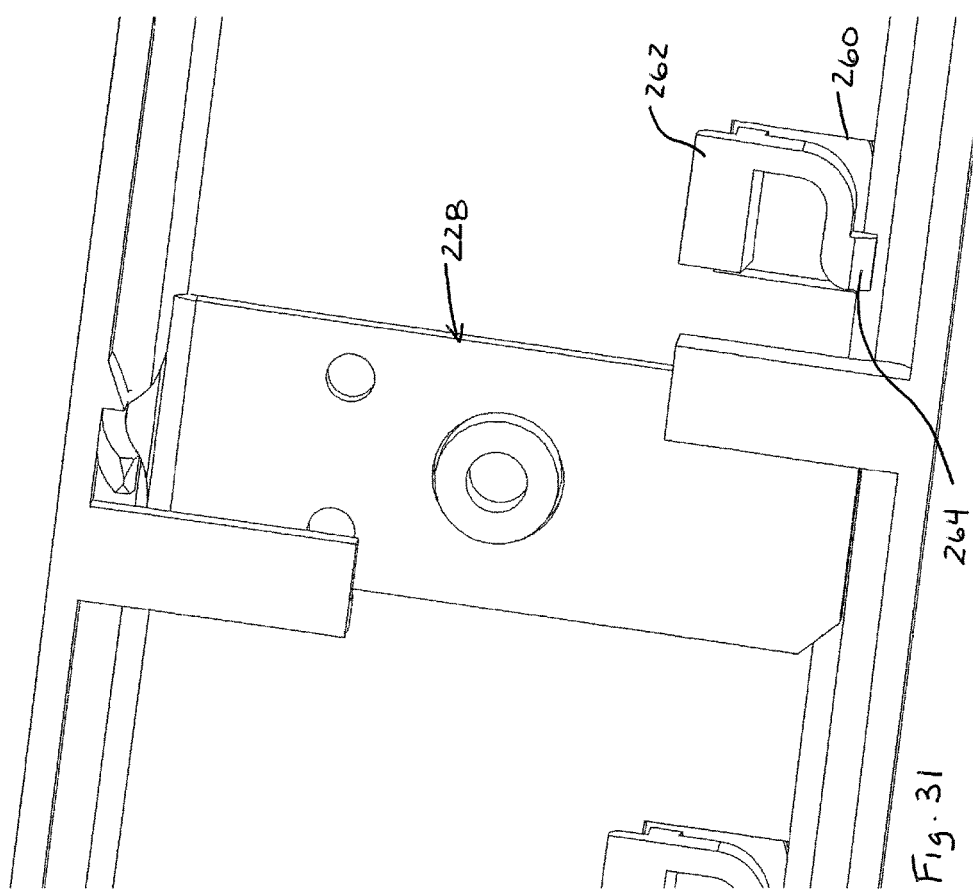

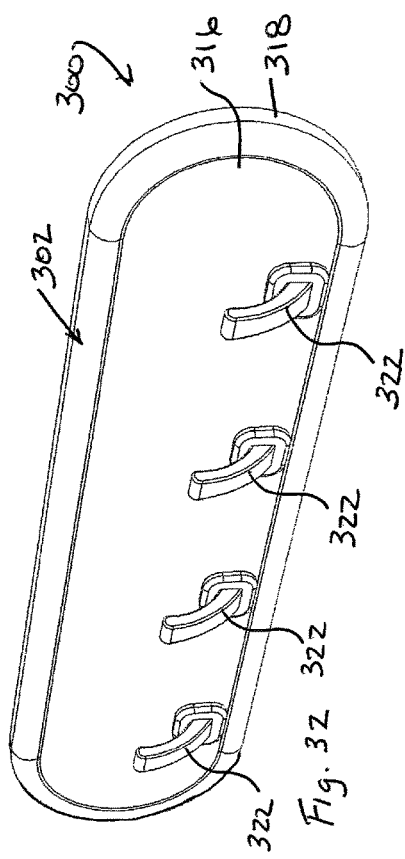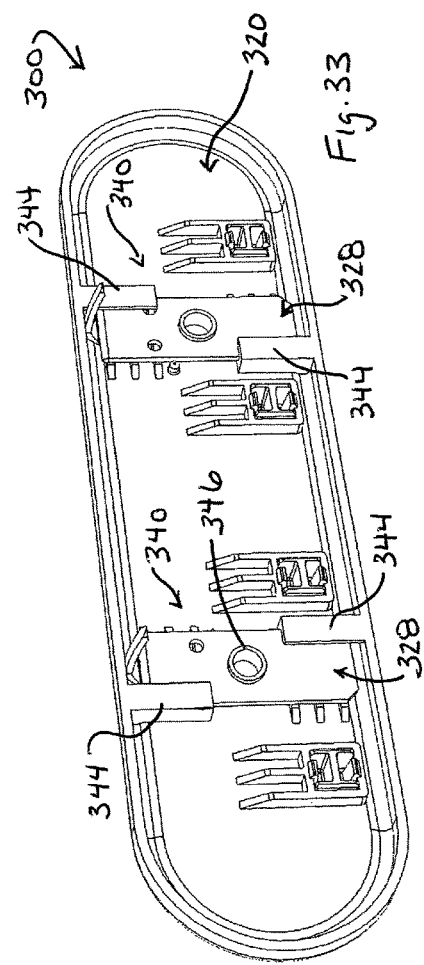

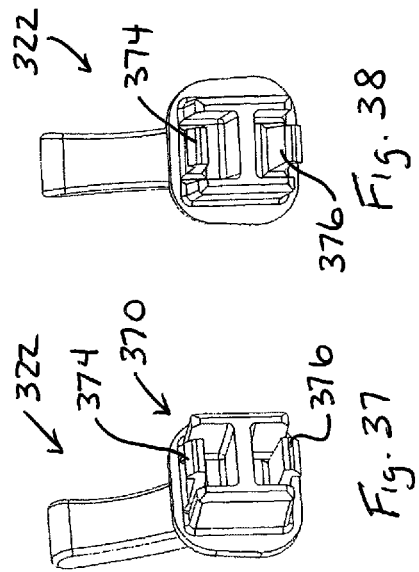
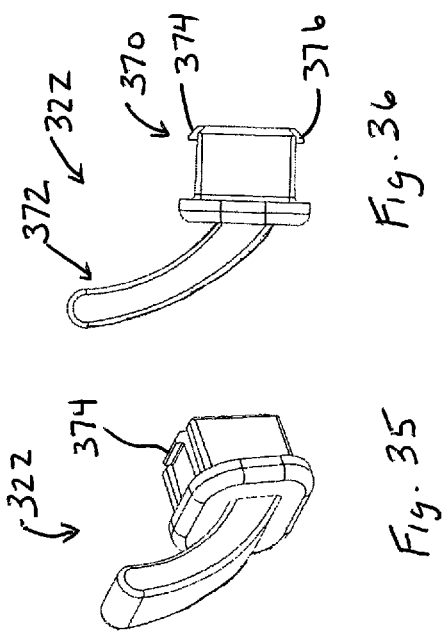

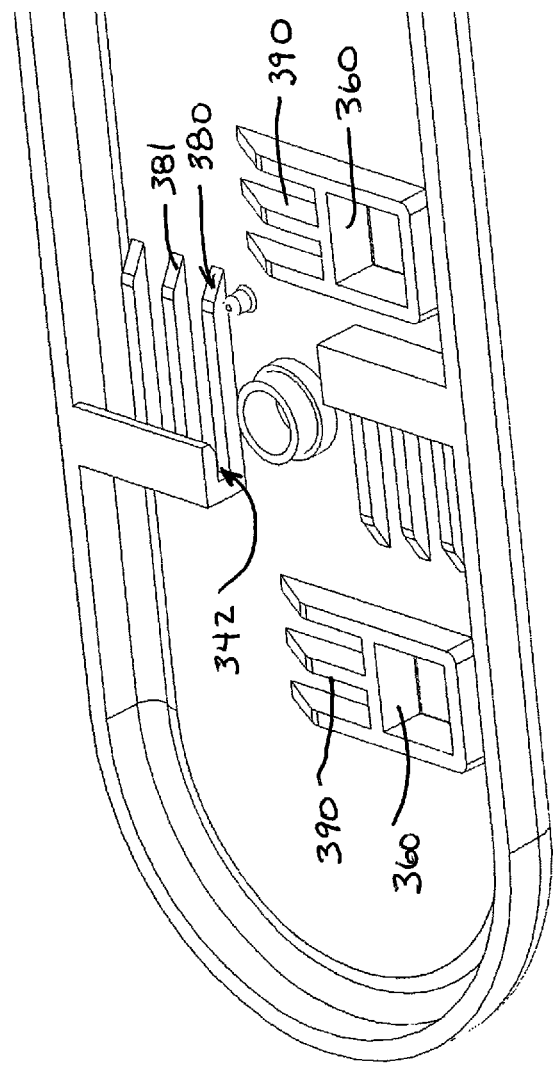

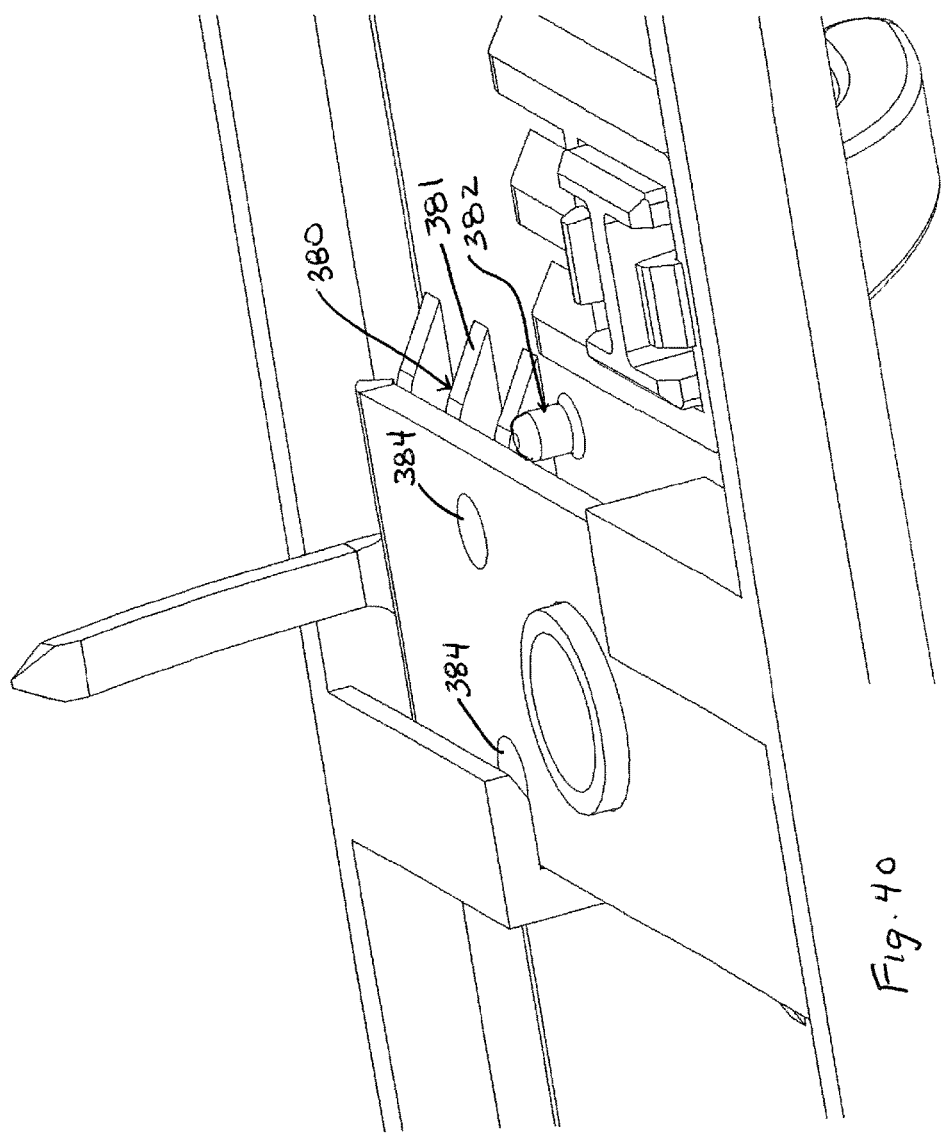

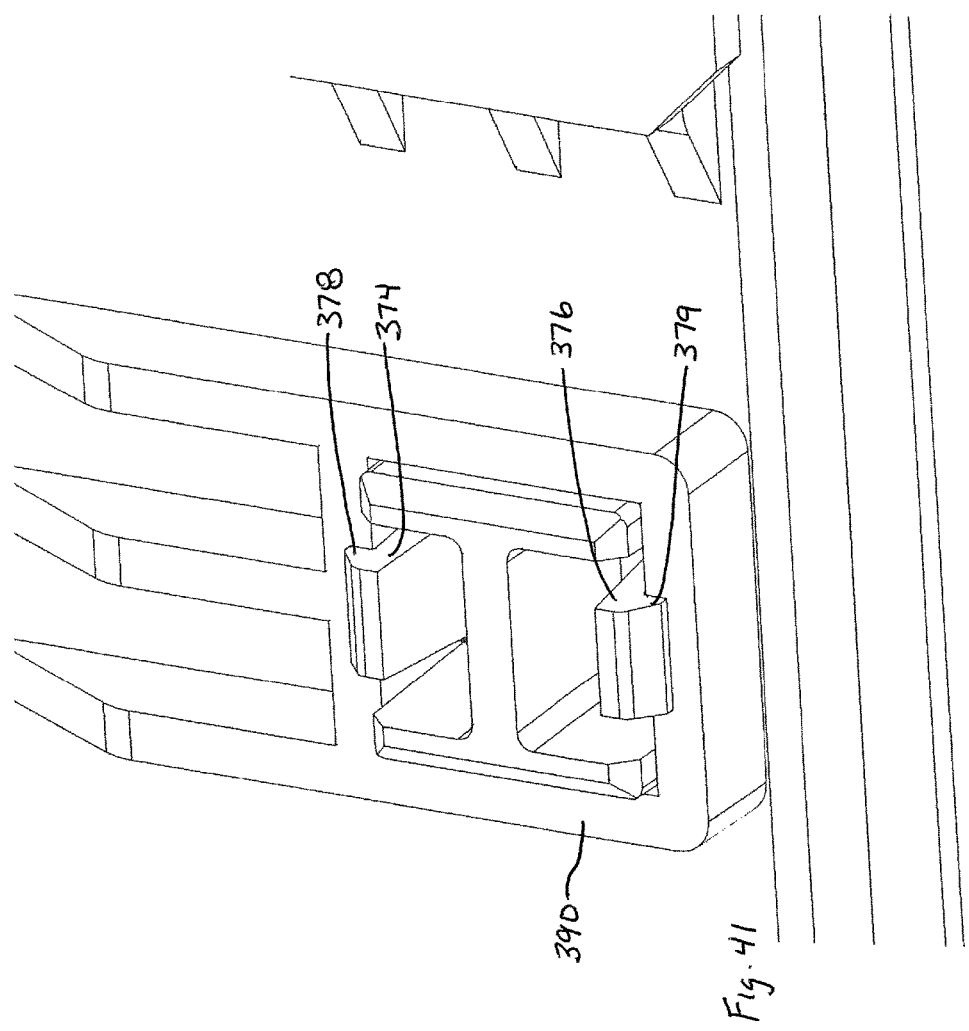

HOOK RAIL

TECHNICAL FIELD

This application relates generally to wall-mounted hooks, and more particularly to wall-mounted hook rails and related mount anchor components.

BACKGROUND

Numerous products exist for installing a hook or hanging device in a wall, such as for hanging a picture frame, a mirror, or the like. Conventional nails and screws are not always convenient solutions and may not provide sufficient support strength in the wall, particularly in the case of drywall, or other friable wallboards, which are relatively weak.

Anchors incorporating curved saber tooth shaped retainers are known from U.S. Pat. Nos. 8,974,166 and 8,414,239. However, such anchors are still difficult for the typical homeowner to install and use properly because a hammer is generally needed to complete the anchor installation. These anchors also generally have a large wall penetration that tends to crumble and weaken the surrounding wall media adjacent the penetration and leave a large hole that is not easily repaired. It is also impractical to reposition these types of anchors after initial insertion in locations proximate the original hole for the purpose of making minor adjustments.

It would be desirable to provide a hook rail that utilizes an anchor device and related installation method that facilitates ease of installation, but at the same time results in a mounted hook rail with a high support strength and less damage to the wallboard, leaving relatively small holes upon removal and therefore also permitting minor position adjustments if needed.

SUMMARY

The details of one or more embodiments are set forth in the accompanying drawings and the description below. Other features, objects, and advantages will be apparent from the description and drawings, and from the claims.

In one aspect, a hook rail assembly for hanging objects on a wall includes an elongated rail member having front, back, top, bottom, left and right sides, the back side including one or more portions that define a wall mount plane of the rail member. First and second anchor components are connected to the back side of the rail member, each of the first and second anchor components including a base having front, back, top, bottom, left and right sides, at least one wall penetrating retainer extending from the base and having a wall penetrating extent that that protrudes rearwardly of a wall mount plane of the rail member and has a downwardly curved configuration. The front side of the rail member includes multiple protruding hook members. Each of the first and second anchor components is formed separate from the rail member and attached thereto.

In another aspect, a hook rail assembly for hanging objects on a wall includes an elongated rail member for abutting the wall, at least one anchor component connected to a back side of the rail member and at least one hook member positioned at a front side of the rail member. The anchor component includes a base and at least one wall penetrating retainer, the wall penetrating retainer having a wall penetrating extent that that protrudes rearwardly of the rail member and has a curved configuration. The wall penetrating extent is arcuate and has a radius of curvature with a center point proximate a bottom side of the rail member.

In another aspect, a hook rail assembly for hanging objects on a wall includes an elongated rail member for abutting the wall. A first anchor component connects to a back side of the rail member, the anchor component including a base and at least one wall penetrating retainer, the wall penetrating retainer having a wall penetrating extent that that protrudes rearwardly of the rail member and has a curved configuration. A first hook member is positioned on a front side of the rail member. The first anchor components is formed separate from the rail member and attached thereto and the first hook member is formed separate from the rail member and attached thereto. A common fastener engages the first anchor component and the first hook member to secure both the first anchor component and the first hook member to the rail member. Additional anchor components may be similarly mounted to the rail member.

In a further aspect, a hook rail assembly for hanging objects on a wall includes an elongated rail member for abutting the wall. A plurality of hook members are positioned on a front side of the rail member. An anchor component is connected to a back side of the rail member, the anchor component including a base and at least one wall penetrating retainer, the wall penetrating retainer having a wall penetrating extent that that protrudes rearwardly of the rail member and has a curved configuration. The back side of the rail member is recessed and includes a seating arrangement comprising spaced apart first and second ribs with respective distal edges. The distal edge of the first rib defines a first recessed slot and the distal edge of the second rib defines a second recessed slot, the first recessed slot aligned with the second recessed slot, the first recessed slot and the second recessed slot receive and support a base of the anchor component. Additional anchor components may be similarly mounted to the rail member.

BRIEF DESCRIPTION OF THE DRAWINGS

FIGS. 20-23 show another embodiment of a hook rail assembly;

FIGS. 24-26 show another embodiment of a hook rail assembly;

FIG. 31. shows a partial rear perspective of the rail assembly of FIG. 26;

FIGS. 32-34 show another embodiment of a hook rail assembly;

FIGS. 35-38 show views of a hook member of the assembly of FIG. 32;

FIGS. 39-41 show partial rear perspectives of the assembly of FIG. 32.

DETAILED DESCRIPTION

Figure 1:
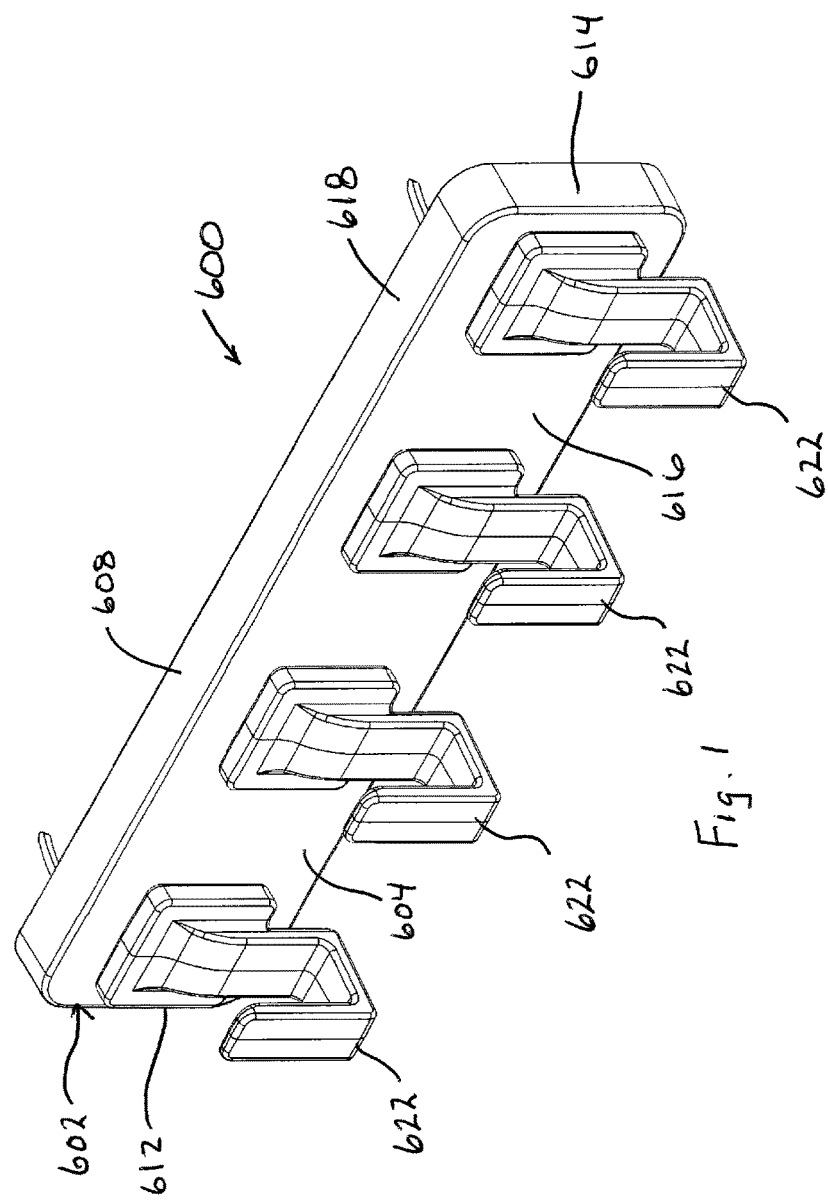
FIGS. 1-3 show an embodiment of a hook rail assembly'

In the drawings and description of the various embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials. However, it is also recognized that in some applications the anchor assemblies may be installed into harder wall materials by utilizing pre-drilled holes.

Figure 2:
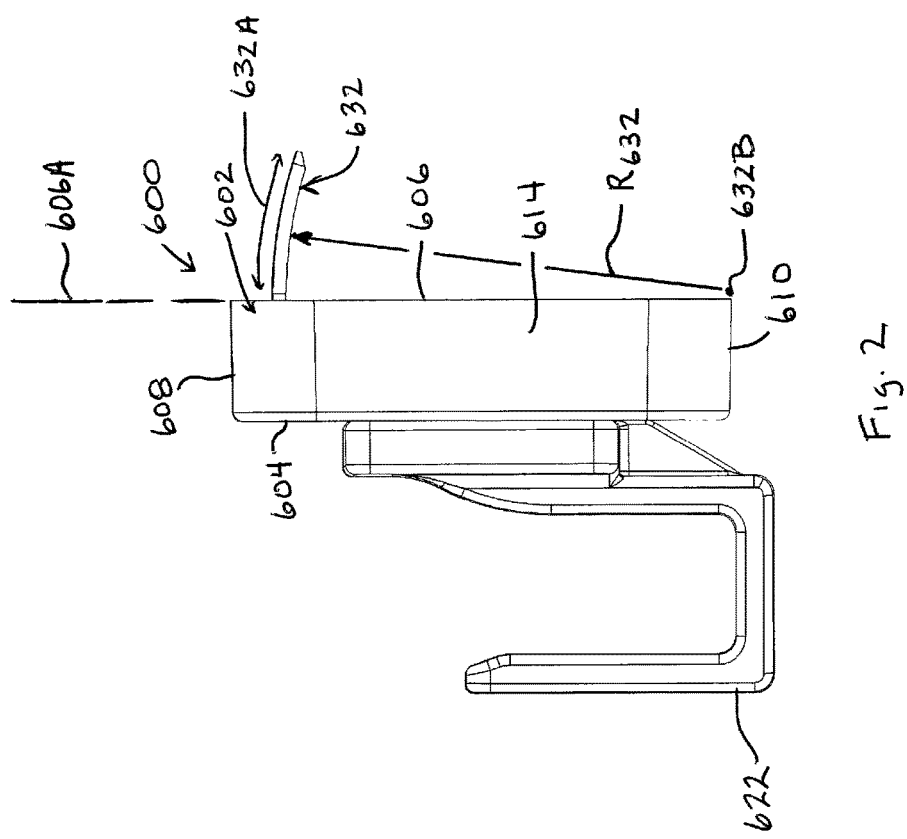
Figure 3:
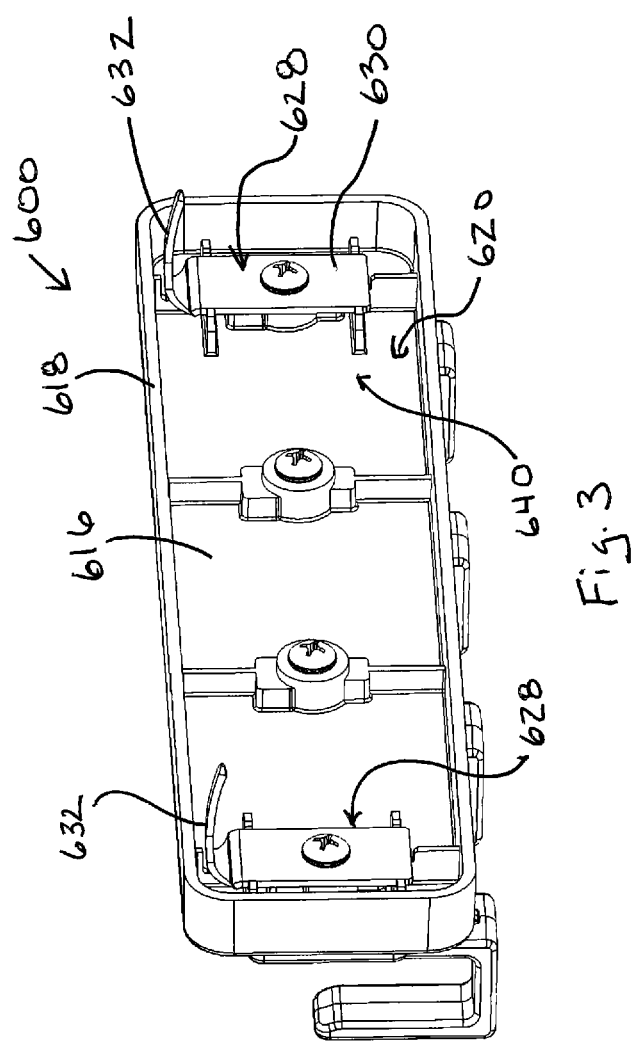
Figure 4:
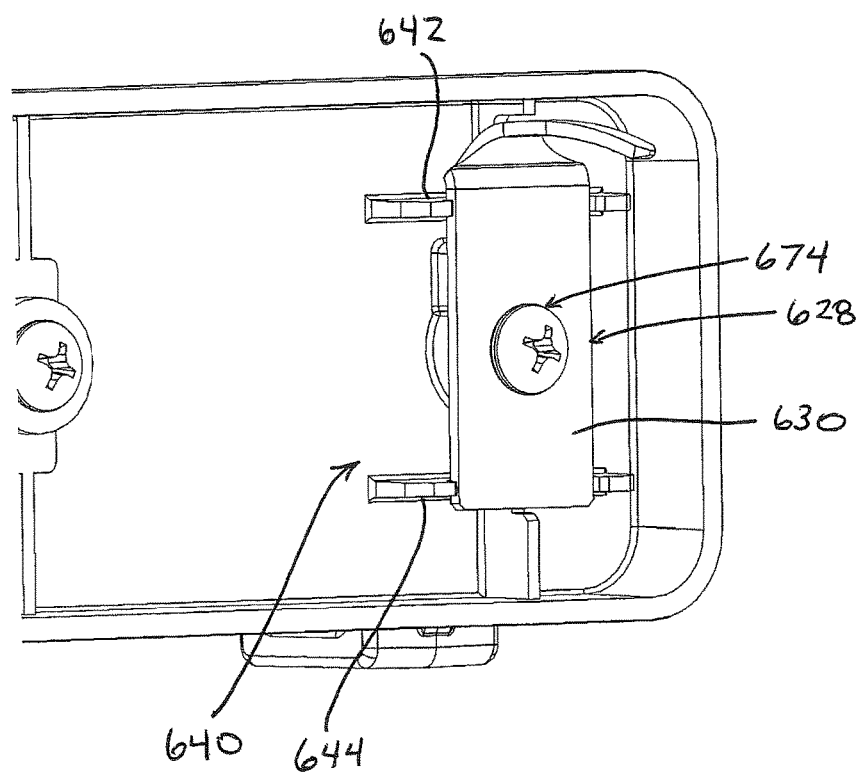
FIG. 4 shows a partial rear perspective view of the hook rail assembly.
Figure 5:
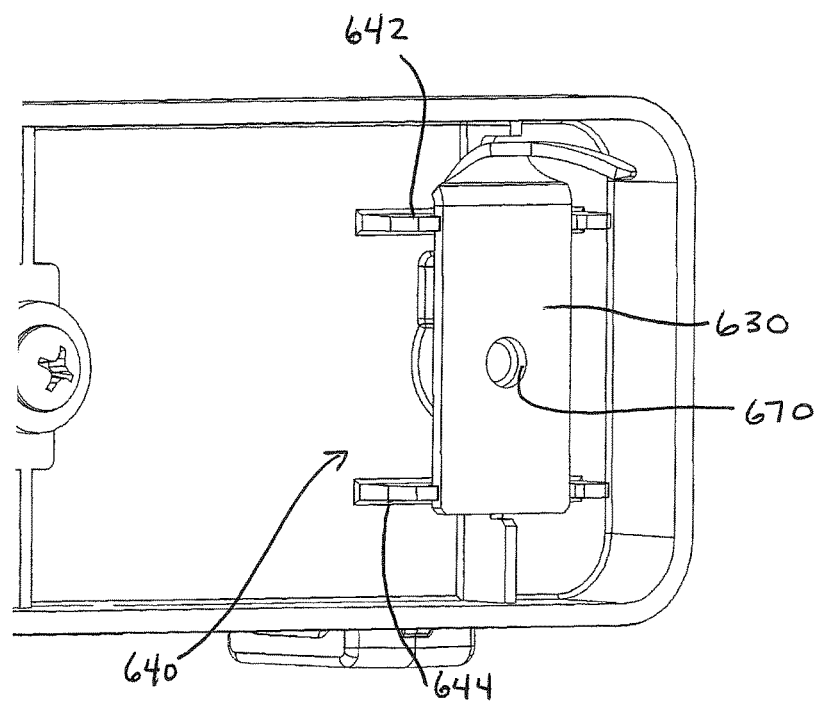
FIGS. 5-7 show partial rear perspective views of the hook rail assembly with various components progressively removed.
Figure 6:
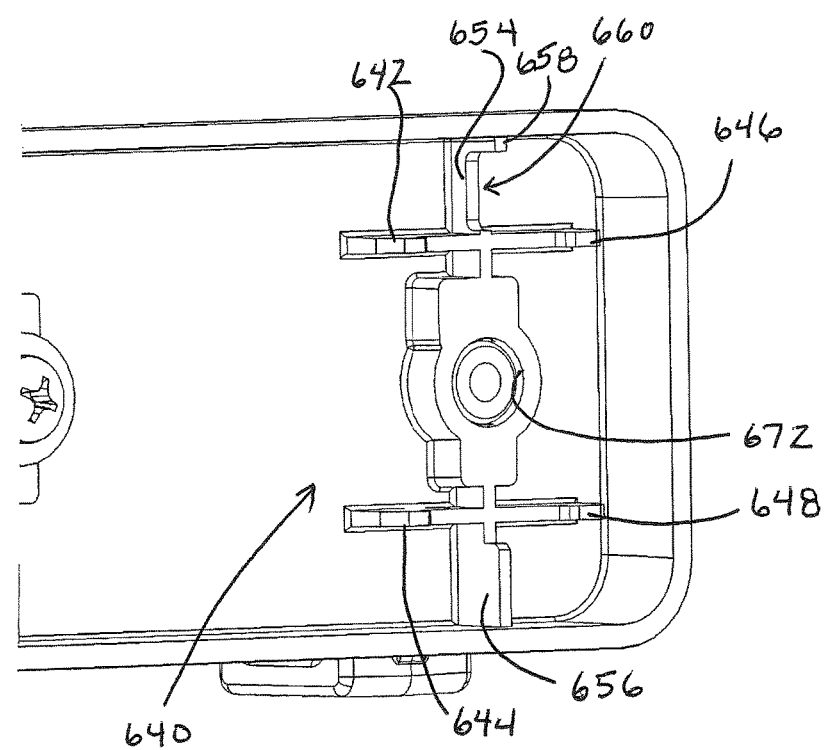

Referring to FIGS. 1-3, one embodiment of a hook rail assembly 600 is shown and includes an elongated rail member 602 having front 604, back 606, top 608, bottom 610, left 612 and right 614 sides. The elongated rail member as a primary body portion 616 surrounded by a peripheral rim portion 618 that extends rearwardly the define a recess 620 at the back side of the rail member. By way of example, the rail member may be of molded plastic construction and monolithic in form, but variations are possible. For example, the primary body portion 616 and the rim portion 618 may be formed separately and connected together, enabling a common rim portion to be used in combination with a number of different body portions (e.g., body portions with different numbers of hooks and/or body portions with differing graphic features). Forming the base member of plastic may facilitate more high end and detailed finishes. However, the rail member may also be formed of materials other than plastic.

The front side of the rail member 602 includes multiple protruding hook members 622. Here the hook members connect substantially along the height of the rail member and protrude forward, but other variations are possible. The hook members 622 are formed separately from and connected to the rail member, but hook members formed monolithic with the rail member are also contemplated.

Figure 13:
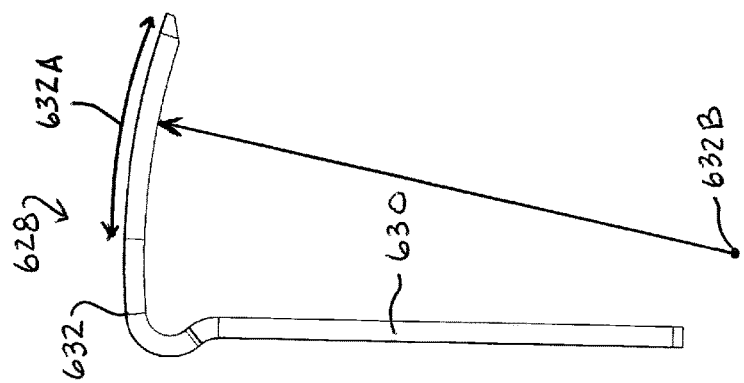
Figure 16:
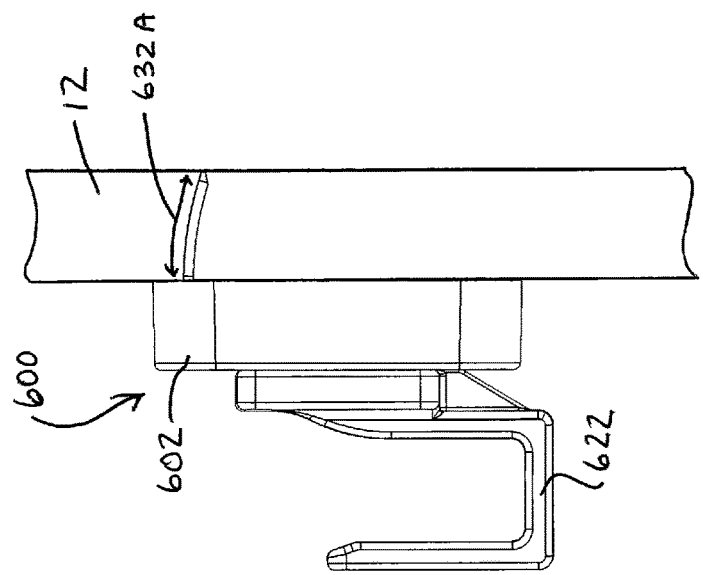
FIGS. 15-16 depict an exemplary wall installation sequence of the assembly.
Figure 15:
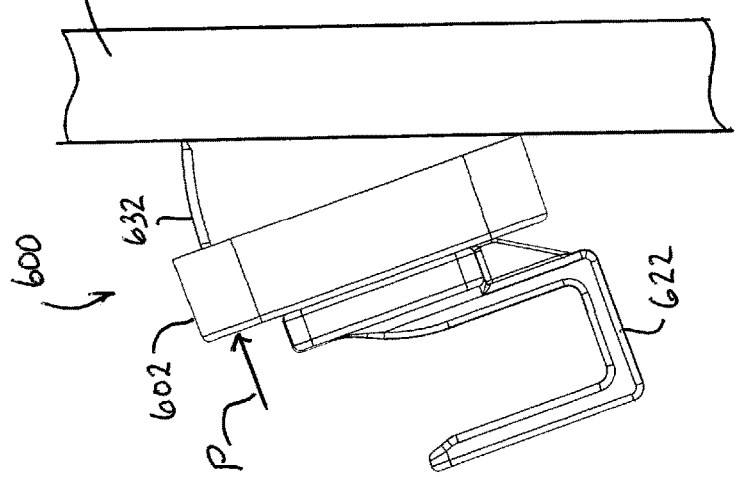

A plurality of anchor components (here just two) 628 are connected at the back side of the rail member, within the recess 620. Each anchor component 628 may be of metal plate construction and includes a base plate 630 having front, back, top, bottom, left and right sides, and at least one wall penetrating retainer 632 extending rearwardly from the base plate and having a downwardly curved configuration. Each anchor component is formed separate from the rail member 602 and is attached thereto at the back side utilizing cooperating structural features on each of the anchor component and the rail member. Each wall penetrating retainer includes a wall penetrating extent 632A that that protrudes rearwardly of a wall mount plane 606A of the rail member and has a downwardly curved configuration. In particular, the wall penetrating extent may be arcuate in configuration, where a center 632B of the radius of curvature $R_{632}$ of the wall penetrating extents 632A is below and rearward of the bottom of the base plate 630 (per FIG. 13) so as to be located at the bottom, rear corner or edge of the rail member 602 (per FIG. 2) once the anchor component is installed on the rail member so that the bottom rear corner can best act as the pivot line for anchor installation into a wall 12 (per FIGS. 15 and 16) as pressure P is applied to the front side or the rail member to pivotally rotate the wall penetrating extents of the retainers into the wall and achieve the installation/mounting of the hook rail assembly on the wall. This geometry minimizes the energy and force required to insert the retainers, minimizes damage to the wall and results in small wall surface perforations when the hook rail assembly is removed from the wall 12.

As best seen in FIGS. 4-7, the back side of the rail member 602 may include features to create an anchor seating arrangement 640 for each of the anchor components 628. The anchor seating arrangement retains the anchor component to the rail member in a desired location and orientation. In the illustrated embodiment, each anchor seating arrangement 640 includes spaced apart ribs 642, 644 with respective rearwardly facing distal edges 646, 648. The distal edge of rib 642 defines a recessed slot 650 and the distal edge of the rib 644 defines a recessed slot 652, where the two slots 650, 652 are aligned to receive and support the base 630 of the anchor component 628. The rib portions at the sides of the slots help to position and retain the anchor components against lateral or rotational movement during assembly. As shown, the ribs 642, 644 run substantially parallel to each other. Rib 654 interconnects with and runs substantially perpendicularly upward from the rib 642, and rib 656 interconnects with and runs substantially perpendicularly downward from the rib 644. Thus, the ribs 654 and 656 extend in substantially opposite directions.

As will be described in further detail below, the wall penetrating retainer 632 of the anchor components extends from the base and has an initial forward progression. To accommodate this configuration, a distal edge 658 of the rib 654 is recessed per slot 660 relative to the distal edge of the rib 642 in slot 650. On the other hand, the distal edge 662 of the rib 656 is not recessed relative to the distal edge of the rib 644 in slot 652. Thus, the anchor component 628 can only be seated in the seating arrangement with the wall penetrating retainer 632 positioned by the rib 654. This configuration helps assure that the anchor components are always installed to the rail member in a specific, desired orientation.

Figure 7:
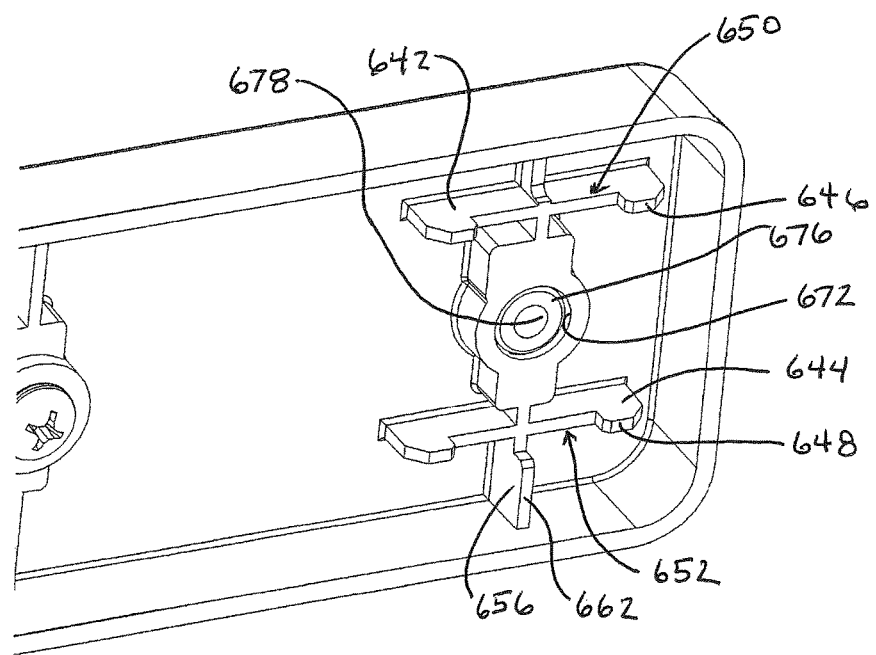
Figure 8:
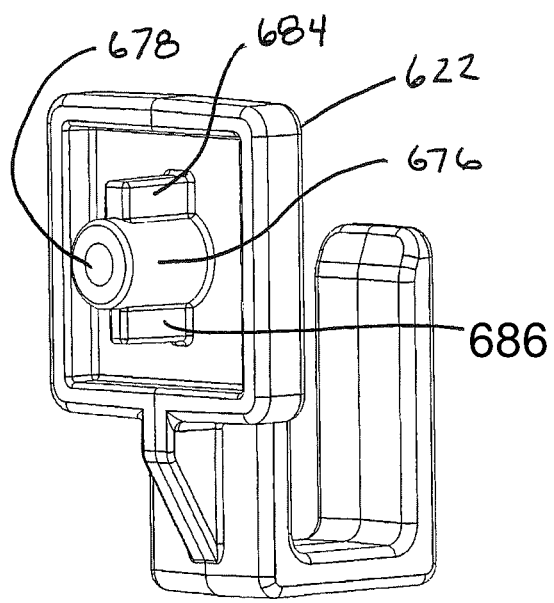
FIG. 8 shows a perspective view of one hook member of the assembly.
Figure 9:
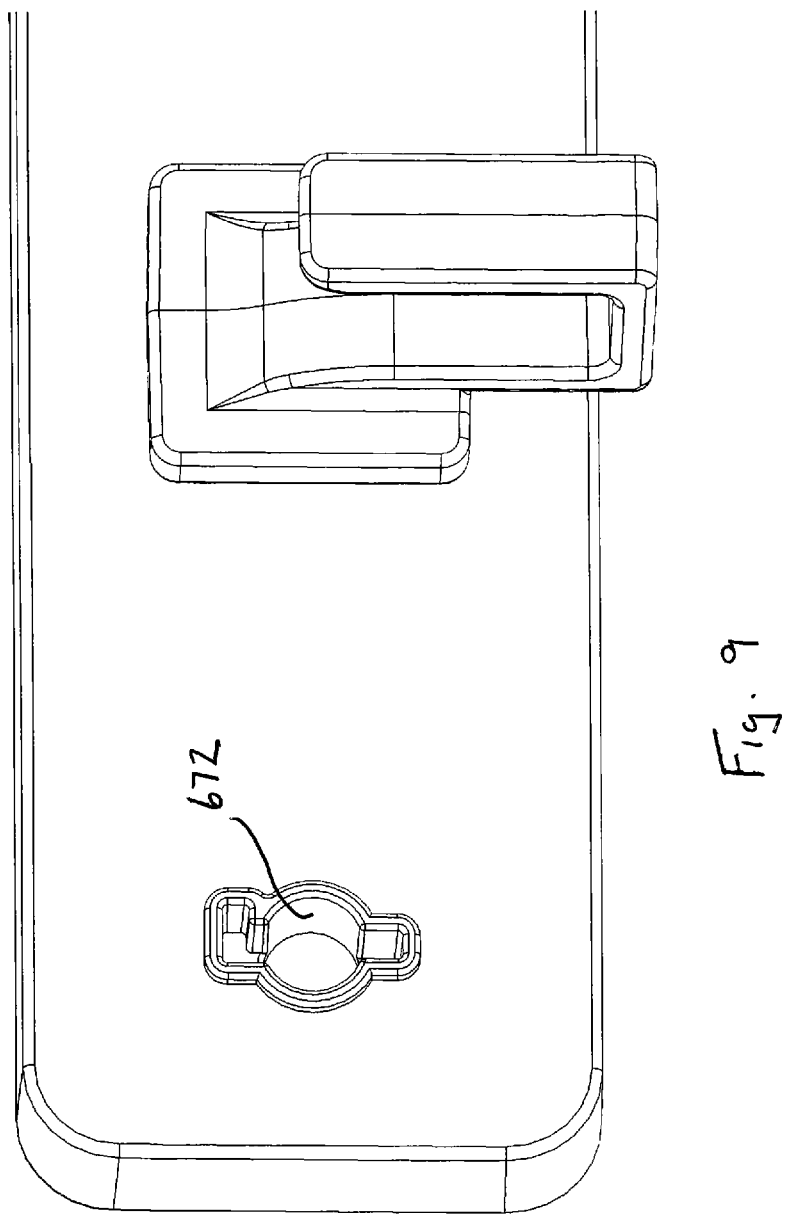
FIG. 9 shows a partial front perspective of the assembly with a hook member removed.
Figure 10:
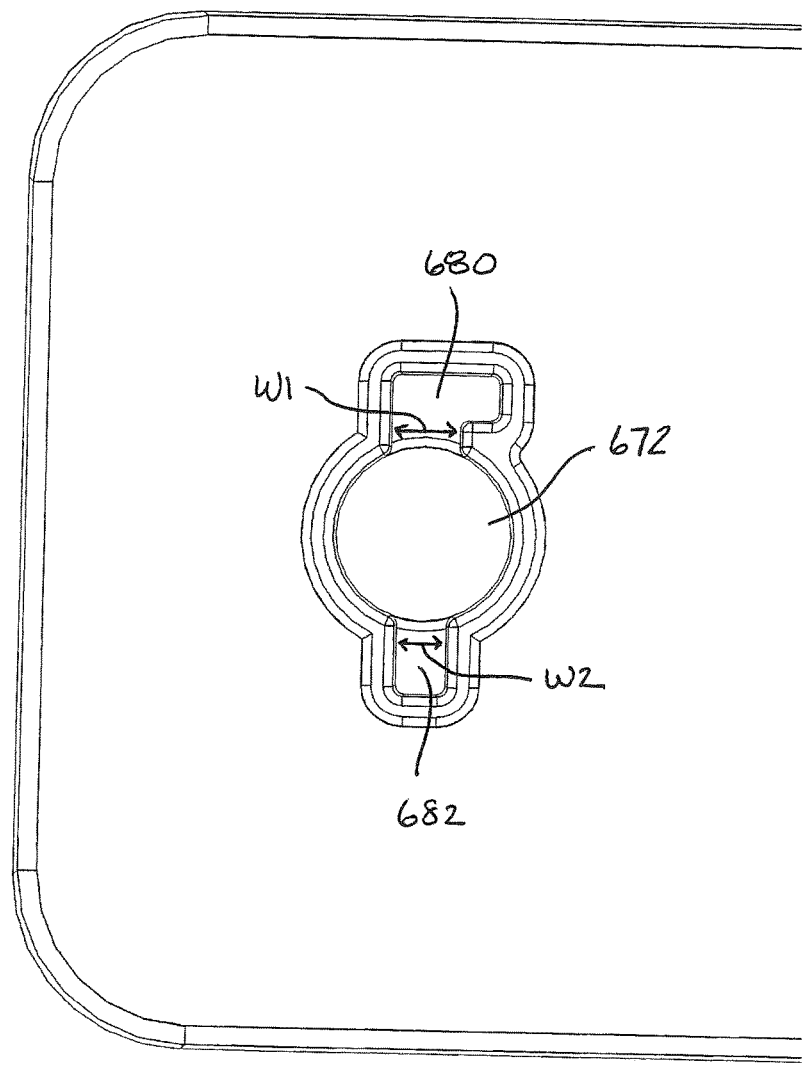
FIG. 10 shows a partial front elevation of the assembly with a hook member removed.
Figure 11:
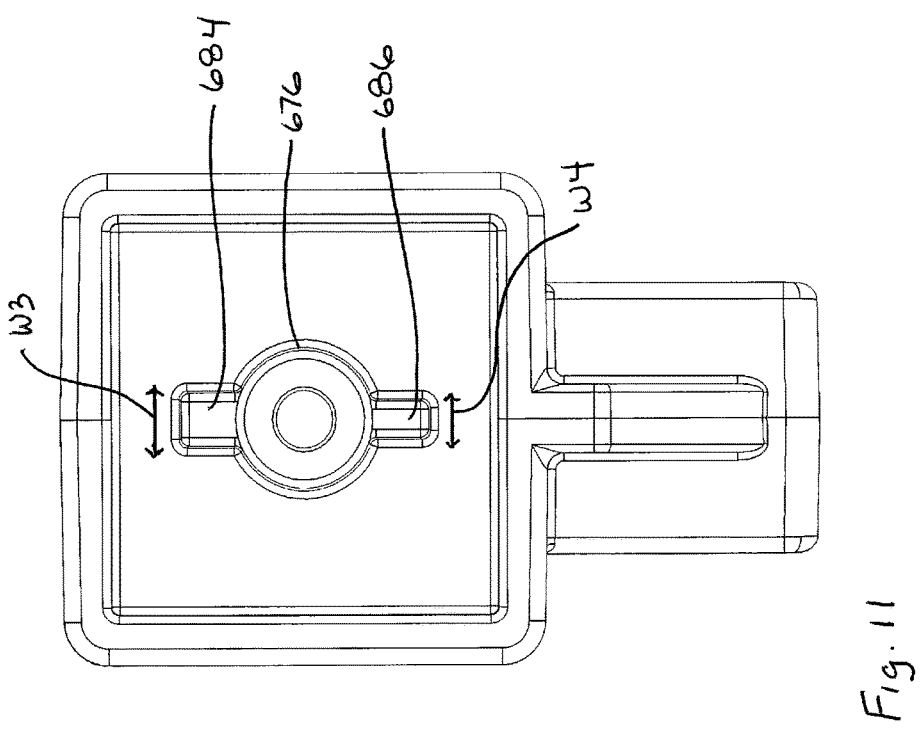
FIG. 11 is a rear elevation of the hook member of FIG. 8.

In terms of fixing the anchor components to the rail member, each anchor component includes a mount opening 670 in its base 630, and each seating arrangement 640 includes a mount hole 672 that is aligned with the mount opening 670. A screw or other fastener 674 passes through the mount opening 670 and into the mount hole 672 to secure the anchor component to the rail member, with a head of the screw engaged with the rear side of the anchor component base 630. As seen in FIGS. 7 and 8, each hook member 622 includes a rearwardly protruding boss 676 positioned within the rail member mount hole 672, where the boss 676 includes a passage 678. Upon assembly, the threaded end of the screw engages the passage 678 in order to secure both the anchor component and the hook member to the rail member.

As seen in FIGS. 8-11, the front side of the each mount hole 672 includes a keyed configuration and the hook member boss 676 includes a similar keyed configuration to assure that the boss 676 can only be inserted into the mount hole 672 in a specified, desired orientation. The specified orientations of the mount bosses of all the hooks may be matched to assure similar hook member orientation on the rail member. In the illustrated embodiment the keyed configuration of the mount hole 672 is formed by a central round hole with upper and lower slot extensions 680 and 682, where a width W1 of the upper slot extension 680 is greater than the width W2 of the lower slot extension 682. The keyed configuration of the mount boss 676 includes a central round projection with upper and lower rib extensions 684 and 686, where a width W3 of the upper rib extension 684 is greater than the width W4 of the lower rib extension 686. The width W3 of upper rib extension 684 is sized to fit within the upper slot extension 680, but not the lower slot extension 682. The widths of the upper and lower parts of the slot and rib extensions could be reversed, and other keyed configurations could also be used.

Figure 14:
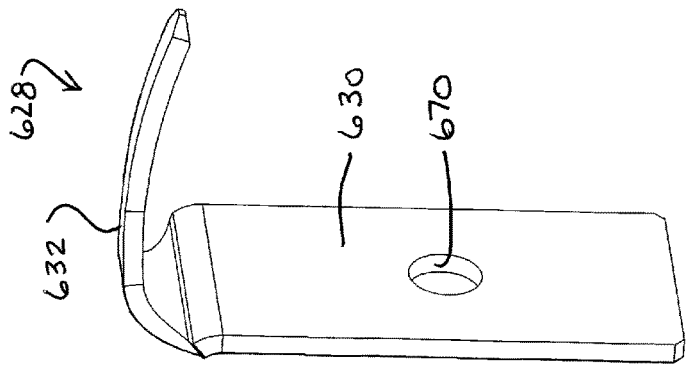
FIGS. 12-14 show an anchor component of the assembly.
Figure 12:
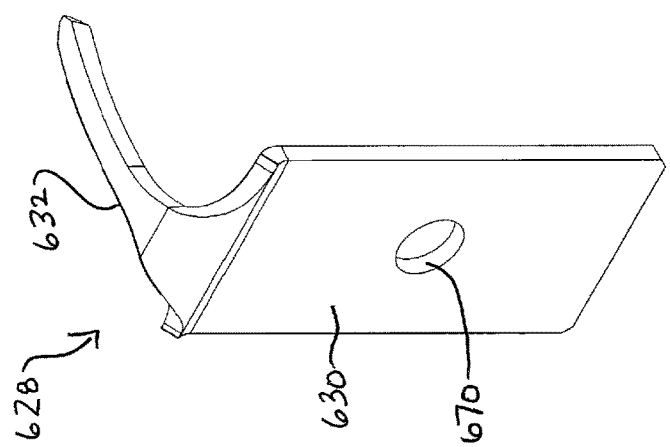

Notably, the anchor components 628 utilized in connection with the hook rail assembly 600 are configured to enable straightforward mounting of the hook rail assembly to a wall. In particular, and referring to FIGS. 12-14, the anchor component 628 includes a base 630 having front sides. In the illustrated configuration the base 630 is formed by a base plate (e.g., metal plate), the front side and back side are formed by the substantially planar front and rear surfaces of the base plate, and the top side, bottom side, left side and right side are formed by respective edges of the base plate. It is recognized that different configurations for the base 630 are possible.

A wall penetrating retainer 632 extends from the base and has a rearwardly protruding wall penetrating extent 632A with a primarily downwardly curved configuration as will be described in greater detail below. In the embodiment of anchor component 628, the wall penetrating retainer 632 is formed monolithic with the plate material of the base plate (e.g., utilizing a progressive stamping operation). In the illustrated anchor component 628, the retainer 632 is formed by an appropriately bent portion of metal plate and departs from a side edge of the base plate.

In one implementation, the metal plate may be cold rolled alloy sheet steel (e.g., AISI 4130 per ASTM A506/507) with a thickness of between about 0.040 inches and about 0.052 inches (e.g., no more than 0.052 inches), and the resulting anchor component may have a tensile yield strength of no less than 160 KSI and a minimum elongation of 3%. By making use of this ultra-high strength steel a thinner plate material can be utilized to achieve a desired load rating, enabling reduced cross-sectional size of the wall penetrating retainers in order to reduce required insertion force and minimize wall damage. The elongation characteristic assures adequate ductility after hardening.

Figure 17:
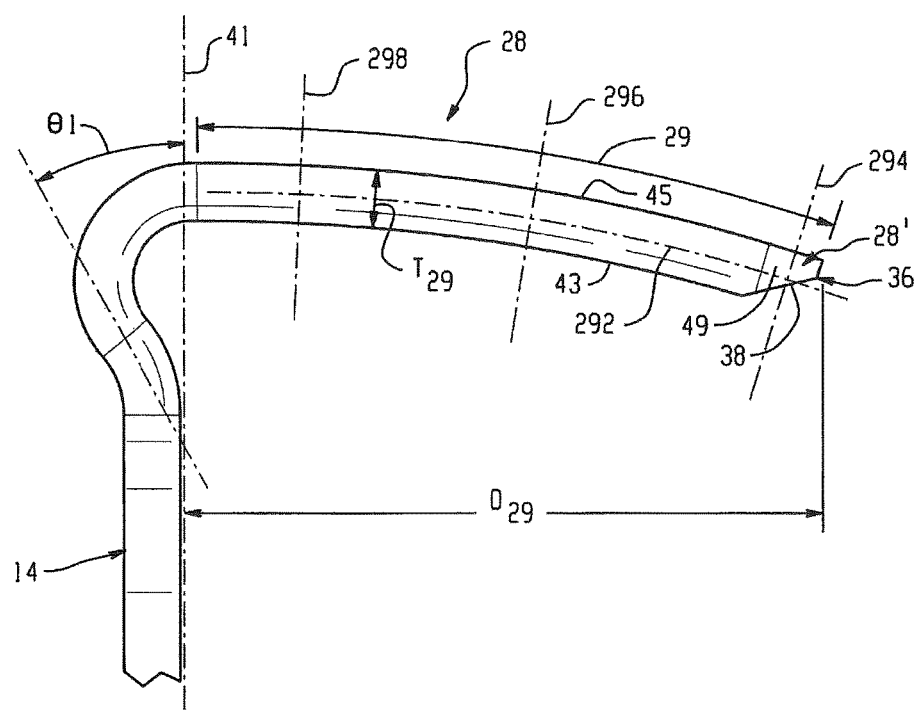
FIG. 17 shows a partial side elevation of the upper portion of the anchor component.

Referring now primarily to FIG. 17, in certain embodiments, each wall penetrating retainer (here identified as 28) departs the base (here identified as 14) with an initial forward progression reflected by angle θ1 and then turns back (e.g., with the illustrated relatively sharp curve) to define a rearward and downward progression along the wall penetrating extent (here identified as 29). By way of example, angle θ1 (e.g., taken relative to a plane parallel to a mount plane 41 at the back side of the base) may be between about 3 degrees and about 30 degrees (e.g., between about 10 degrees and about 20 degrees or between about 15 degrees and about 25 degrees), though variations are possible. The initial forward progression can be achieved by a slight forward bend in the entire top edge of the base as shown, or can be achieved by having only the retainers bend forward as they leave the top edge of the base plate. This forward progression feature is advantageous because it provides clearance for a generous bend retainer radius at the juncture of the retainer and the base plate to prevent stress cracking at this point of maximum bending load. In this regard, the initial portion of each wall penetrating retainer 28 that is forward of the back side of the base curves forward and then curves rearward as shown, and a radius of curvature at every point along the initial portion may no less than 125% (e.g., no less than 100%) of the plate thickness.

In order to facilitate installation of a hook rail assembly, the wall penetrating retainers of the anchor components can also be configured with other advantageous features.

For example, to facilitate manual wallboard penetration and passage without tools, utilizing thumb force only (e.g., applied at the thumb capture zones), the wallboard penetrating retainers 28 may be formed with a relatively smooth external surface finish (e.g., achieved by polishing, painting or plating). In this regard, the surface of the wallboard penetrating retainers 28 can be manufactured with or modified to a maximum average surface roughness of about 20 μinch (e.g., in some cases a maximum average surface roughness of about 15 μinch). In one implementation, just the wallboard penetrating extent of each wallboard penetrating retainers is worked, processed or otherwise formed to achieve this desired low surface roughness feature in order to reduce manufacturing cost. The latter implementation would reduce install force but maintain friction on the rougher portions of the penetrating retainer to resist removal forces. The retainers may have a polished surface finish and/or a plated surface finish and/or a painted finish and/or a lubricant (e.g., Teflon) incorporated into the surface finish.

Figure 18:
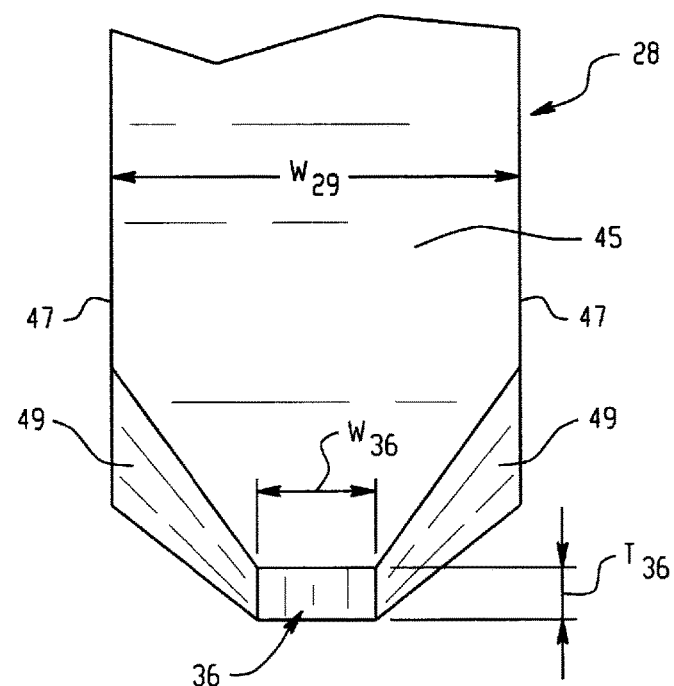
FIG. 18 shows a partial rear elevation of the retainer of the anchor component.

Referring to FIGS. 17 and 18, the distal end 28' of each wallboard penetrating retainer 28 may include a pointed tip that is shaped to provide a point 36 when viewed in cross-section taken along a vertical plane running along a length of the wallboard penetrating retainer, where the point 36 is defined by a bevel 38 at a bottom side of the distal end of the wallboard penetrating retainer. In particular, in the illustrated side elevation it is seen that the wall penetrating extent 29 includes a concave curved surface 43 separated form a convex curved surface 45, and lateral and opposed side surfaces 47 that are substantially planar and that extend between the convex curved surface and the concave curved surface. The bevel 38 extends from the concave surface 43 toward the point 36 and little or no bevel extends from the convex surface 45 toward the point 36, to thereby place the point 36 closer to the convex surface of the wall penetrating extent. This type of beveled point is advantageous because the applicants have discovered that including a bevel at the top side of the wallboard penetrating retainer disadvantageously creates a reaction force with the wallboard material that tends to cause the bottom side of the base plate to be pivoted out away from the front surface of the wallboard. Side bevels 49 may also be optionally incorporated to achieve the point 36 as shown. In one implementation, a lateral width W36 of the point is no more than 35% of a lateral width W29 of a major portion of the wall penetrating extent, and a thickness T36 of the point is no more than about 40% of a thickness T29 of the major portion of the wall penetrating extent.

Figure 19:
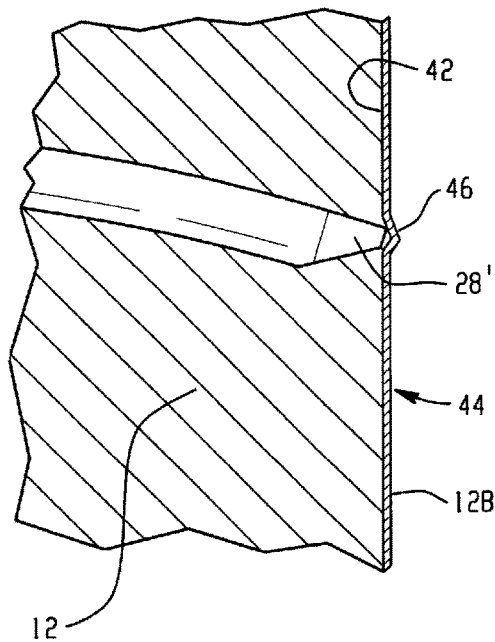
FIG. 19 shows one embodiment of an anchor retainer within a wall.
Figure 26:
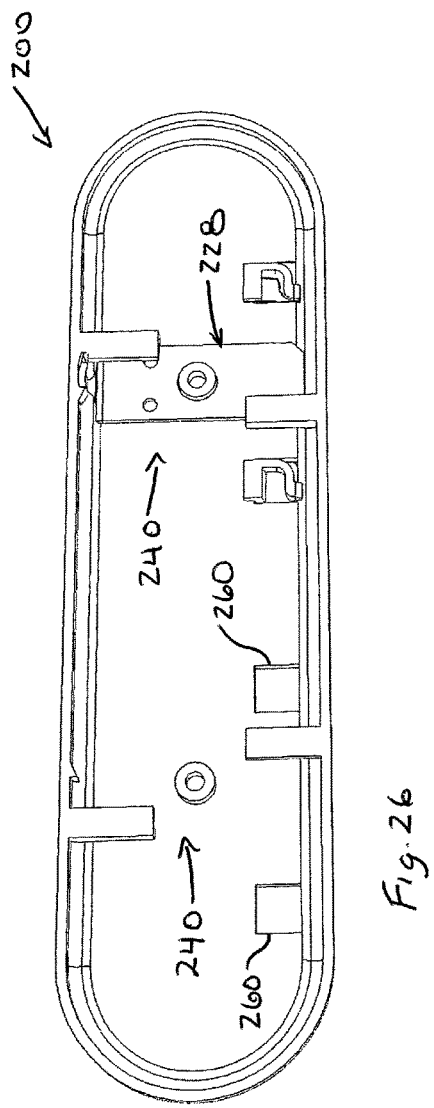
Figure 27:
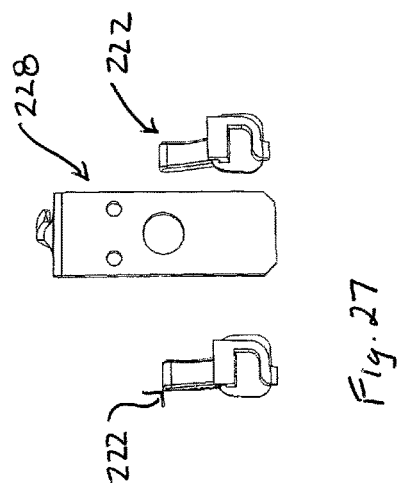
FIG. 27 shows hook members and an anchor component of the hook rail assembly of FIG. 26.

In this regard, proper sizing of the wallboard penetrating retainer(s) can also be used to achieve more user friendly performance of an anchor component. In particular, per FIG. 19, in some implementations when the hook rail assembly is installed at the front surface of the wallboard, the distal ends 28' of the wallboard penetrating retainers 28 may be positioned proximate to a wallboard rear surface 12B without passing through the rear surface. In some arrangements of this type, the distal end 28' of the wallboard penetrating retainer actually contacts an internal side 42 of the paper layer 44 that defines the rear surface of the wallboard but, again, does not pass through the paper layer 44. The distal end of the wallboard penetrating retainer may even cause a localized rearward protrusion 46 in the paper layer 44 at a point of contact with the paper layer but, again, without passing through the paper layer 44. Arrangements of this type, in which the wallboard penetrating retainer is in contact with or proximate the paper layer 44 defining the rear surface 12B without passing through that paper layer are advantageous in that applicants have discovered that it can take five pounds or more of additional force to install if the distal ends of the retainers must pass through rear paper layer 44 in order to achieve final anchor component seating position. Of course, in some embodiments the retainers could be longer and pierce the back paper layer of the wallboard.

In one example, low insertion forces for the retainer(s) of a given hook rail assembly may be achieved where the retainers have pointed distal ends as described above and a generally uniform cross-section along the remainder of the wall penetrating extent of the retainer, where an area of the cross-section is no more than about 2.5 mm$^2$. In one example, in the case retainers of rectangular cross-section, the main segment of the wall penetrating extent of each retainer may be on the order of 0.042 inches by 0.068 inches (e.g., 0.042 inches thick and 0.068 inches wide), resulting in a cross-sectional area of about 0.00286 in$^2$ (about 1.845 mm$^2$). In another example, the main segment of the wall penetrating extent may have a rectangular cross-section on the order of 0.050 inches by 0.075 inches (e.g., 0.050 inches thick and 0.075 inches wide), resulting in a cross-sectional area of about 0.00375 in$^2$ (about 2.419 mm$^2$). It may be advantageous (e.g., for the purpose of ease of install and/or for the purpose of limiting wall damage) to assure that the total retainer cross-sectional area (e.g., the combined cross-sectional area of the two retainers of hook rail assembly 600) is no more than about 5 mm$^2$ (about 0.008 square inches, or in some cases no more than about 6 mm$^2$), where the cross-section of each wall penetrating extent of the retainer is taken perpendicularly to a lengthwise axis 292 (FIG. 17) of the retainer (which axis is curved like the retainer) and is taken at any location along a length of the wall penetrating extent 29 that will embed within a wall (e.g., a cross-section in any of planes 294, 296 or 298). This arrangement facilitates installation and reduced wall hole size that must be repaired after removal.

Referring now to FIGS. 20-23, another embodiment of a hook rail assembly 100 is shown and includes an elongated rail member 102 having front 104, back 106, top 108, bottom 110, left 112 and right 114 sides. The elongated rail member as a primary body portion 116 surrounded by a peripheral rim portion 118 that extends rearwardly the define a recess 120 at the back side of the rail member. The front side of the rail member 102 includes multiple protruding hook members 122. Here the hook members connect at the bottom side of the rail member and protrude forward, but other variations are possible. Likewise, the hook members 122 are of monolithic construction with the rail member, but could be formed separately and attached.

A plurality of anchor components (here just two) 128 are connected at the back side of the rail member, within the recess 120. Each anchor component 128 may be of metal plate construction and includes a base plate 130 having front, back, top, bottom, left and right sides, and at least one wall penetrating retainer 132 extending rearwardly from the base plate and having a downwardly curved configuration similar to that of the embodiments described above. Each anchor component is formed separate from the rail member 102 and is attached thereto at the back side utilizing cooperating structural features on each of the anchor component and the rail member. The anchor components 128 may be of similar configuration to anchor components 628 described above.

The back side of the rail member includes an anchor seating arrangement 140 for each of the anchor components. The anchor seating arrangement retains the anchor to the rail member. In the illustrated embodiment, each anchor seating arrangement 140 includes a set of vertically and horizontally spaced apart slots 142 into which opposite corners of the anchor component 128 are positioned when the anchor component is in a seated position (e.g., the position shown in FIG. 21). Here each slot 142 is formed by bar member 144 with an L-shaped end profile, but other configurations are possible. Each anchor seating arrangement 140 also includes a circumferential protrusion 146 that passes through a circumferential opening of the base plate 130 of its respective anchor component 128. This cooperative arrangement enables the anchor component 128 to be attached to the rail member by initially placing the anchor component onto the protrusion 146 with the anchor in an initial position in which the base plate does not engage the slots (e.g., the position represented by dashed line anchor form 128' in FIG. 22). The anchor component can then be rotated about the protrusion 146 (in the counter-clockwise direction of arrow 150 in FIG. 22) in order to move the anchor component into its seated position. As seen in illustrated embodiment of FIG. 21, the orientation of the slots of the two seating arrangements is opposite each other, so that one anchor component (the left in FIG. 22) would be rotated counter-clockwise to reach its seated position and the other anchor component (the right in FIG. 22) would be rotated clockwise to reach its seated position.

In order to hold each anchor component in its seated position, each anchor seating arrangement 140 also includes at least one retention feature 152 that engages with the anchor component to inhibit rotation of the anchor component 128 from the seated position back to the initial position. In the illustrated embodiment the retention feature 152 is formed by a short finger that extends from part of the rim portion 118 of the rail member and includes a curved or ramped surface portion 154 that interacts with the anchor retainer 132. In particular, the anchor retainer 132 slides along the surface portion 154 during the rotation of the anchor component into the seated position. When the retainer 132 clears the finger, an edge 156 of the finger engages with an edge of the retainer 132 to hold the retainer in place. The finger 152 may flex slightly during this process. Likewise, at least some relative flex between each anchor component and its retention feature 152 may be provided to enable the anchor component to be rotated from the seated position to the initial position.

Referring now to FIGS. 24-31, another embodiment of a hook rail assembly 200 is shown and includes an elongated rail member 202 having front 204, back 206, top 208, bottom 210, left 212 and right 214 sides. The elongated rail member as a primary body portion 216 surrounded by a peripheral rim portion 218 that extends rearwardly the define a recess 220 at the back side of the rail member. Anchor components 228 are of similar configuration to anchor components 128, and anchor seating arrangements 240 of are of similar configuration to anchor seating arrangements 140 above.

Figure 30:
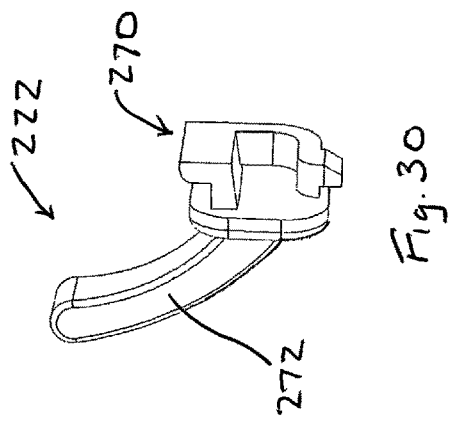
FIGS. 28-30 show views of the hook member.
Figure 29:
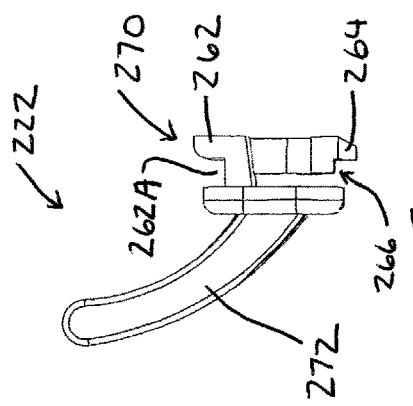
Figure 28:
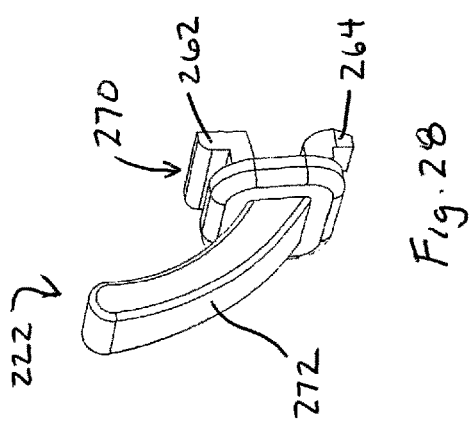
Figure 34:
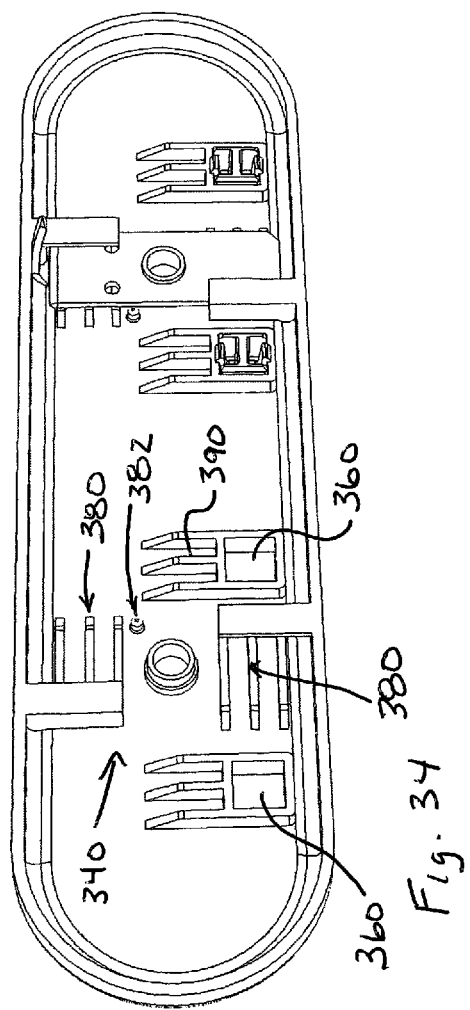

The rail assembly includes a plurality of hook members 222. The hook members 222 are initially formed separately from and the attached to the rail member 202. For this purpose the rail member 202 includes a plurality of hook receiving openings 260 through which a connecting end 270 of a hook member is positioned. In this regard, in the illustrated embodiment the through openings 260 and the hook members 222 are respectively sized and shaped to enable the hook member to be connected into the through opening by inserting the connecting end 270 through the opening 260 at the front side of the rail and sliding the slot 262A to the top edge of the opening 260. The lower flange 264 then deflects and snaps over the bottom edge of the opening 260. Once installed, the connecting end 270 of each hook member includes spaced apart upper and lower retention flanges 262 and 264 that extend beyond respective peripheral edges of the rail member through opening 260 (e.g., see FIG. 31). As seen in FIGS. 28-30, the lower flange 264 may in part define a rail engaging lateral edge or corner 266 that can engage with a lower peripheral edge of the through opening to transfer weight of the hook onto the rail member. The corner 266 will also serve as a pivot about which the hook will attempt to rotate when loaded, in which case the upper flange 262 will engage with the back side of the rail member to prevent the hook from being pulled or rotated forwardly out of the rail member.

Where the hook members are removable from the rail member, the hook members can be packed as separate pieces (e.g., laying down sideways in a package that also includes the rail member) in order to reduce space taken up by the package and thus reduce shipping costs.

Another embodiment of a hook rail assembly 300 is shown in FIGS. 32-41 and includes an elongated rail member 302 having front, back, top, bottom, left and right sides. The elongated rail member as a primary body portion 316 surrounded by a peripheral rim portion 318 that extends rearwardly the define a recess 320 at the back side of the rail member. Anchor components 328 are generally of similar configuration to anchor components 128 and 228, and anchor seating arrangements 340 have some similar features to anchor seating arrangements 140 and 240 above. In particular, each anchor seating arrangement 340 includes slots 342, bars 344 and a protrusion 346 engaged by an opening in the anchor base plate. The seating arrangement 340 also includes a plurality of ribs 380 extending rearwardly on the rail member in the vicinity of the bars 344 that in part define the slots 342 and that help guide the anchor component base plate into the slot as the anchor component is rotated into its seated position. The ribs 380 may have tapered entry edges 381 for this purpose. The ribs 380 toward the upper side of the anchor component also provide a strengthening of the rail member in the vicinity of the location where pressure will be applied during installation of the rail assembly into the wall.

The seating arrangement 340 also includes a rearwardly projecting feature 382 (here a pin-shaped member, though other shaped projections could be used) that acts as the anchor retention feature. Each base plate includes a further opening 384 that aligns with the pin member 382 when the anchor component is in the initial position so as to enable the corner regions of the anchor component base plate to enter the slots 342. When the anchor component 328 is rotated into its seated position, the surface of the base plate slides over the pin (e.g., the upper end of the pin or other feature may be ramped or tapered for this purpose) until the edge of the base plate clears the pin 382 and drops laterally alongside the upper portion of the pin 382. The interaction of the pin 382 and base plate edge then inhibits rotation of the anchor component out of its seated position under normal operating conditions. Notably, each anchor component includes a set of spaced apart openings 384 so that the identical anchor component configuration can be used for either a seating arrangement with counter-clockwise anchor component seating or clockwise anchor component seating.

The hook members 322 are initially formed separately and then attached to the rail member 302. In this embodiment the through openings 360 of the rail member are surrounded by rib features 390 projecting rearwardly at the back side of the rail member that strengthen the rail member in the vicinity of hook connection. The hook members 322 include a connecting end 370 and a hook end 372, where the connecting end is adapted for linear insertion through the rail member opening 360. In this regarding, the connecting end 370 includes upper and lower retention fingers 374 and 376 that flex inward as they interact with the edges of the opening 360 when the connecting end is passed from the front side of the rail member through the opening 360. As retention tabs or flanges 378 and 379 on the fingers clear the back edge of the opening, the fingers flex back outward so that the tabs 378, 379 will extend beyond the perimeter of the opening to retain the hooks on the rail member (e.g., see FIG. 41).

It is to be clearly understood that the above description is intended by way of illustration and example only, is not intended to be taken by way of limitation, and that other changes and modifications are possible. For example, while the illustrated hook rail assemblies contemplate multiple hooks and multiple anchors connected to a rail member, it is recognized that a single anchor could be connected at the back side of a single hook (e.g., a fashion hook) in a manner similar to that described above to achieve a hook and anchor assembly. Moreover, other variations of attachment of the anchor component(s) to the rail member are possible, such as overmolding or heat stacking or any other suitable manner.

What is claimed is:

1. A hook rail assembly for hanging objects on a wall, comprising:
   an elongated rail member for abutting the wall;
   at least one anchor component connected to a back side of the rail member, the anchor component including a base and at least one wall penetrating retainer, the wall penetrating retainer having a wall penetrating extent that that protrudes rearwardly of the rail member and has a curved configuration, wherein the anchor component is connected within a recess of the back side of the rail member, a back side of the base is spaced forward from a wall mount plane of the rail member and a front side of the base is spaced rearward of a front side of the rail member, wherein the front side of the rail member covers the recess, wherein the wall penetrating extent includes a distal end defining a tip that is configured to penetrate a wall;
   at least one hook member positioned at a front side of the rail member;
   wherein the wall penetrating extent is arcuate and has a radius of curvature with a center point proximate a bottom side of the rail member.

2. The hook rail assembly of claim 1 wherein the center point is proximate a bottom rear corner of the rail member.

3. The hook rail assembly of claim 2 wherein the anchor component is connected to the rail member such that a relative position between the anchor component and the rail member does not change during installation of the hook rail assembly on a wall.

4. A hook rail assembly for hanging objects on a wall, comprising:
   an elongated rail member having a front side, a back side, a top side, a bottom side, a left side and a right side, the back side including one or more portions that define a wall mount plane of the rail member;
   first and second anchor components connected to the back side of the rail member, each of the first and second anchor components including a base having a front side, a back side, a top side, a bottom side, a left side and a right side, at least one wall penetrating retainer extending from the base and having a wall penetrating extent that that protrudes rearwardly of a wall mount plane of the rail member and has a downwardly curved configuration,
   the front side of the rail member including multiple protruding hook members;
   wherein each of the first and second anchor components is formed separate from the rail member and attached thereto, wherein each of the first and second anchor components is attached to the rail member such that a relative position between the anchor component and the rail member does not change during installation of the hook rail assembly on a wall, wherein the bottom side of each base is located above the bottom side of the rail member, wherein the wall penetrating extent of each of the first and second anchor components is arcuate and has a radius of curvature with a center point proximate the bottom side of the rail member.

5. The hook rail assembly of claim 4 wherein the rail member is of molded plastic material, the back side of the rail member is recessed and includes a first seating arrangement to which the first anchor component is retained and a second seating arrangement to which the second anchor component is retained, wherein each of the first and second anchor components is of metal material.

6. A hook rail assembly for hanging objects on a wall, comprising:
   an elongated rail member having a front side, a back side, a top side, a bottom side, a left side and a right side, the back side including one or more portions that define a wall mount plane of the rail member;
   first and second anchor components connected to the back side of the rail member, each of the first and second anchor components including a base having a front side, a back side, a top side, a bottom side, a left side and a right side, at least one wall penetrating retainer extending from the base and having a wall penetrating extent that that protrudes rearwardly of a wall mount plane of the rail member and has a downwardly curved configuration,
   the front side of the rail member including multiple protruding hook members;
   wherein each of the first and second anchor components is formed separate from the rail member and attached thereto;
   wherein the rail member is of molded plastic material, the back side of the rail member is recessed and includes a first seating arrangement to which the first anchor component is retained and a second seating arrangement to which the second anchor component is retained, wherein each of the first and second anchor components is of metal material;
   wherein the first anchor component includes a first mount opening in the base of the first anchor component, the second anchor component includes a second mount opening in the base of the second anchor component, the first seating arrangement includes a first mount hole aligned with the first mount opening, the second seating arrangement includes a second mount hole aligned with the second mount opening, a first fastener passing through the first mount opening and into the first mount hole to secure the first anchor component, a second fastener passing through the second mount opening and into the second mount hole to secure the second anchor component.

7. The hook rail assembly of claim 6 wherein the multiple protruding hook members include a first hook member having a first rearwardly protruding boss positioned within the first mount hole and a second hook member having a second rearwardly protruding boss positioned with the second mount hole, wherein the first fastener engages a first passage in the first boss to secure both the first anchor component and the first hook member to the rail member, wherein the second fastener engages a second passage in the second boss to secure both the second anchor component and the second hook member to the rail member.

8. The hook rail assembly of claim 7 wherein a front side of the first mount hole includes a keyed configuration and the first boss includes a keyed configuration to assure that the first boss can only be inserted into the first mount hole in a specified orientation, wherein a front side of the second mount hole includes a keyed configuration and the second boss includes a keyed configuration to assure that the second boss can only be inserted into the second mount hole in a specified orientation, wherein the specified orientation of the first mount boss and the specified orientation of the second mount boss are matched to assure similar hook orientation on the rail member.

9. The hook rail assembly of claim 4 wherein each center point is proximate a bottom rear corner of the rail member.

10. The hook rail assembly of claim 9 wherein the back side of the first anchor component is spaced forward from the wall mount plane of the rail member and the back side of the second anchor component is spaced forward from the wall mount plane of the rail member.

11. A hook rail assembly for hanging objects on a wall, comprising:
   an elongated rail member having a front side, a back side, a top side, a bottom side, a left side and a right side, the back side including one or more portions that define a wall mount plane of the rail member;
   first and second anchor components connected to the back side of the rail member, each of the first and second anchor components including a base having a front side, a back side, a top side, a bottom side, a left side and a right side, at least one wall penetrating retainer extending from the base and having a wall penetrating extent that that protrudes rearwardly of a wall mount plane of the rail member and has a downwardly curved configuration,
   the front side of the rail member including multiple protruding hook members;
   wherein each of the first and second anchor components is formed separate from the rail member and attached thereto;
   wherein the rail member is of molded plastic material, the back side of the rail member is recessed and includes a first seating arrangement to which the first anchor component is retained and a second seating arrangement to which the second anchor component is retained, wherein each of the first and second anchor components is of metal material;

wherein the first seating arrangement includes spaced apart ribs with recessed slots that receive and support the base of the first anchor component, the second seating arrangement includes spaced apart ribs with recessed slots that receive and support the base of the second anchor component.

12. The hook rail assembly of claim 5 wherein the first seating arrangement is configured to receive the first anchor component only when the first anchor component is in a specific orientation, the second seating arrangement is configured to receive the second anchor component only when the second anchor component is in a specific orientation, wherein the specific orientation of the first anchor component and the specific orientation of the second anchor component are matched to assure similar anchor component orientation on the rail member.

13. A hook rail assembly for hanging objects on a wall, comprising:
    an elongated rail member for abutting the wall;
    a first anchor component connected to a back side of the rail member, the anchor component including a base and at least one wall penetrating retainer, the wall penetrating retainer having a wall penetrating extent that protrudes rearwardly of the rail member and has a curved configuration;
    a first hook member positioned on a front side of the rail member;
    wherein the first anchor component is formed separate from the rail member and attached thereto and the first hook member is formed separate from the rail member and attached thereto, and wherein a shared fastener engages the first anchor component and the first hook member to secure both the first anchor component and the first hook member to the rail member;
    wherein the wall penetrating extent includes a distal end defining a pointed tip that is spaced rearwardly of the rail member.

14. The hook rail assembly of claim 13 wherein the first anchor component includes a first mount opening in the base of the first anchor component, the rail member includes a first mount hole aligned with the first mount opening, the first hook member includes a rearwardly protruding boss positioned within the first mount hole, the common fastener passes through the first mount opening, into the first mount hole and engages a passage in the rearwardly protruding boss to secure both the first anchor component and the first hook member to the rail member.

15. The hook rail assembly of claim 14 wherein a front side of the first mount hole includes a keyed configuration and the rearwardly protruding boss includes a keyed configuration to assure that the first boss can only be inserted into the first mount hole in a specified orientation.

16. A hook rail assembly for hanging objects on a wall, comprising:
    an elongated rail member for abutting the wall;
    a plurality of hook members positioned on a front side of the rail member;
    an anchor component connected to a back side of the rail member, the anchor component including a base and at least one wall penetrating retainer, the wall penetrating retainer having a wall penetrating extent that protrudes rearwardly of the rail member and has a curved configuration, wherein the wall penetrating extent includes a distal end defining a pointed tip that is spaced rearwardly of the rail member,
    wherein the back side of the rail member is recessed and includes a seating arrangement comprising spaced apart first and second ribs with respective distal edges, the distal edge of the first rib including a first recessed slot formed in and along the distal edge of the first rib and the distal edge of the second rib including a second recessed slot formed in and along the distal edge of the second rib, the first recessed slot spaced from and aligned with the second recessed slot, the first recessed slot and the second recessed slot receive and support the base of the anchor component.

17. The hook rail assembly of claim 16 wherein the first rib and second rib run substantially parallel to each other, wherein a third rib interconnects with and runs substantially perpendicular to the first rib and a fourth rib interconnects and runs substantially perpendicular to the second rib.

18. The hook rail assembly of claim 17 wherein the third rib and the fourth rib extend in opposite directions.

19. A hook rail assembly for hanging objects on a wall, comprising:
    an elongated rail member for abutting the wall;
    a plurality of hook members positioned on a front side of the rail member;
    an anchor component connected to a back side of the rail member, the anchor component including a base and at least one wall penetrating retainer, the wall penetrating retainer having a wall penetrating extent that protrudes rearwardly of the rail member and has a curved configuration,
    wherein the back side of the rail member is recessed and includes a seating arrangement comprising spaced apart first and second ribs with respective distal edges, the distal edge of the first rib defining a first recessed slot and the distal edge of the second rib defining a second recessed slot, the first recessed slot aligned with the second recessed slot, the first recessed slot and the second recessed slot receive and support the base of the anchor component;
    wherein the first rib and second rib run substantially parallel to each other, wherein a third rib interconnects with and runs substantially perpendicular to the first rib and a fourth rib interconnects and runs substantially perpendicular to the second rib;
    wherein the wall penetrating retainer extends from the base and has an initial forward progression, a distal edge of the third rib is recessed relative to the distal edge of the first slot to accommodate the initial forward progression, and the distal edge of the fourth rib is not recessed relative to the second rib, such that the anchor component can only be seated in the seating arrangement with the wall penetrating retainer positioned by the third rib.

* * * * *

UNITED STATES PATENT AND TRADEMARK OFFICE
CERTIFICATE OF CORRECTION

Page 1 of 1

PATENT NO.        : 10,258,180 B2
APPLICATION NO.   : 15/255907
DATED             : April 16, 2019
INVENTOR(S)       : Dale G. Malott et al.

It is certified that error appears in the above-identified patent and that said Letters Patent is hereby corrected as shown below:

On the Title Page

Item [57], Line 7 reads:
"penetrating retainer having a wall penetrating extent that that"
Should read:
-- penetrating retainer having a wall penetrating extent that --

In the Claims

Claim 1, Column 10, Line 49 reads:
"that that protrudes rearwardly of the rail member and"
Should read:
-- that protrudes rearwardly of the rail member and --

Claim 4, Column 11, Line 16 reads:
"extent that that protrudes rearwardly of a wall mount"
Should read:
-- extent that protrudes rearwardly of a wall mount --

Claim 6, Column 11, Line 53 reads:
"extent that that protrudes rearwardly of a wall mount"
Should read:
-- extent that protrudes rearwardly of a wall mount --

Claim 11, Column 12, Line 56 reads:
"extent that that protrudes rearwardly of a wall mount"
Should read:
-- extent that protrudes rearwardly of a wall mount --

Signed and Sealed this
Eighteenth Day of June, 2019

Andrei Iancu
*Director of the United States Patent and Trademark Office*